United States Patent
Hao et al.

(10) Patent No.: US 9,621,337 B2
(45) Date of Patent: Apr. 11, 2017

(54) ADAPTIVE I/O MISMATCH CALIBRATION

(71) Applicant: Marvell World Trade Ltd., St. Michael (BB)

(72) Inventors: Li Hao, Sunnyvale, CA (US); Renaldi Winoto, Danville, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/176,922

(22) Filed: Jun. 8, 2016

(65) Prior Publication Data

US 2016/0359614 A1 Dec. 8, 2016

Related U.S. Application Data

(60) Provisional application No. 62/172,495, filed on Jun. 8, 2015.

(51) Int. Cl.
*H04L 12/26* (2006.01)
*H04L 7/033* (2006.01)
*H04L 7/00* (2006.01)

(52) U.S. Cl.
CPC ............ *H04L 7/033* (2013.01); *H04L 7/0087* (2013.01); *H04L 7/0091* (2013.01)

(58) Field of Classification Search
CPC ...... H04L 7/033; H04L 7/0091; H04L 7/0087
See application file for complete search history.

(56) References Cited

U.S. PATENT DOCUMENTS

| 8,295,845 | B1 | 10/2012 | Abdollahi-Alibeik | |
|---|---|---|---|---|
| 2009/0233562 | A1 | 9/2009 | Kim | |
| 2011/0069767 | A1 | 3/2011 | Zhu | |
| 2012/0300818 | A1* | 11/2012 | Metreaud | H04B 1/30 375/219 |
| 2015/0155955 | A1* | 6/2015 | Chang | H04L 25/03261 375/226 |
| 2016/0006632 | A1* | 1/2016 | Chen | H04L 27/2089 375/224 |

OTHER PUBLICATIONS

International Application No. PCT/IB2016/053373, Notification of Transmittal of the International Search Report and the Written Opinion of the International Searching Authority, mailed Jun. 8, 2016, 10 pages.

* cited by examiner

*Primary Examiner* — Dac Ha

(57) ABSTRACT

The present disclosure includes systems and techniques relating to calibrating I/Q mismatches in communication systems. In some implementations, a reference signal to be transmitted by a transmitter (Tx) is identified. A loopback signal corresponding to the reference signal is generated by passing the reference signal through the TX and a receiver (Rx). The loopback signal includes an additional signal that distinguishes an in-phase/quadrature (I/Q) mismatch caused by the Tx (Tx I/Q mismatch) from an I/Q mismatch caused by the Rx (RX I/Q mismatch). A set of Tx I/Q mismatch parameters and a set of Rx I/Q mismatch parameters are determined based on the reference signal and the loopback signal, using the additional signal. A Tx signal is calibrated based on the set of Tx I/Q mismatch parameters, while a Rx signal is calibrated based on the set of Rx I/Q mismatch parameters, independently from the calibrating the Tx signal.

20 Claims, 9 Drawing Sheets

ADAPTIVE I/O MISMATCH CALIBRATION

CROSS REFERENCE TO RELATED APPLICATIONS

This application claims the benefit of the priority of U.S. Provisional Application Ser. No. 62/172,495, filed on Jun. 8, 2015, and entitled "Method of Adaptive On-line Calibration for Frequency-Dependent I/Q Mismatch in Wideband TDD RF Transceiver," which is hereby incorporated by reference in its entirety.

BACKGROUND

The present disclosure describes systems and techniques relating to calibration of I/Q mismatch in wireless communication systems.

An I/Q mismatch (also referred to as an I/Q imbalance in some instances) occurs due to mismatches between the in-phase (I) and quadrature (Q) signal paths of a transceiver such as a direct conversion transceiver. The transceiver uses a local oscillator (LO) to generate a sinewave. A copy of the sinewave is phase shifted by 90 degrees to produce a quadrature sinusoidal component. The direct LO output is mixed with the original signal, which produces the I signal, whereas the shifted LO output is mixed with the original signal, which produces the Q signal. When mismatches exist between the gain and/or phase of the two sinusoidal signals, the quadrature signals will be corrupted and cause signal demodulation error. In some instances, calibration of I/Q mismatch is performed to compensate, offset, or otherwise control the IQ imbalance so as to reduce or eliminate signal degradations caused by the I/Q mismatch.

SUMMARY

The present disclosure includes systems and techniques relating to calibration of I/Q mismatches in wireless communication systems. According to an aspect of the described systems and techniques, a device includes a transmitter; a receiver; and a processor. When executing computer-readable instructions, the processor causes the device to: identify a reference signal to be transmitted by a transmitter (Tx) of the communication apparatus; generate a loopback signal corresponding to the reference signal by passing the reference signal through the TX and a receiver (Rx) of the communication apparatus, the loopback signal including an additional signal that distinguishes an in-phase/quadrature (I/Q) mismatch caused by the Tx (Tx I/Q mismatch) from an I/Q mismatch caused by the Rx (RX I/Q mismatch); determine a set of Tx I/Q mismatch parameters and a set of Rx I/Q mismatch parameters based on the reference signal and the loopback signal, using the additional signal included in the loopback signal; calibrate a Tx signal based on the set of Tx I/Q mismatch parameters, the Tx signal being a second signal to be transmitted by the Tx; and calibrate a Rx signal based on the set of Rx I/Q mismatch parameters, the Rx signal being a second signal received by the Rx, wherein the calibrating the Rx signal is performed independently from the calibrating the Tx signal.

According to another aspect of the described systems and techniques, a method includes: identifying, by a communication apparatus, a reference signal to be transmitted by a transmitter (Tx) of the communication apparatus; generating, by the communication apparatus, a loopback signal corresponding to the reference signal by passing the reference signal through the TX and a receiver (Rx) of the communication apparatus, the loopback signal including an additional signal that distinguishes an in-phase/quadrature (I/Q) mismatch caused by the Tx (Tx I/Q mismatch) from an I/Q mismatch caused by the Rx (RX I/Q mismatch); determining, by the communication apparatus, a set of Tx I/Q mismatch parameters and a set of Rx I/Q mismatch parameters based on the reference signal and the loopback signal, using the additional signal included in the loopback signal; calibrating, by the communication apparatus, a Tx signal based on the set of Tx I/Q mismatch parameters, the Tx signal being a second signal to be transmitted by the Tx; and calibrating, by the communication apparatus, a Rx signal based on the set of Rx I/Q mismatch parameters, the Rx signal being a second signal received by the Rx, wherein the calibrating the Rx signal is performed independently from the calibrating the Tx signal.

According to another aspect of the described systems and techniques, a non-transitory computer-readable medium embodying a program operable to cause a communication device to perform operations includes: identifying, by a communication apparatus, a reference signal to be transmitted by a transmitter (Tx) of the communication apparatus; generating, by the communication apparatus, a loopback signal corresponding to the reference signal by passing the reference signal through the TX and a receiver (Rx) of the communication apparatus, the loopback signal including an additional signal that distinguishes an in-phase/quadrature (I/Q) mismatch caused by the Tx (Tx I/Q mismatch) from an I/Q mismatch caused by the Rx (RX I/Q mismatch); determining, by the communication apparatus, a set of Tx I/Q mismatch parameters and a set of Rx I/Q mismatch parameters based on the reference signal and the loopback signal, using the additional signal included in the loopback signal; calibrating, by the communication apparatus, a Tx signal based on the set of Tx I/Q mismatch parameters, the Tx signal being a second signal to be transmitted by the Tx; and calibrating, by the communication apparatus, a Rx signal based on the set of Rx I/Q mismatch parameters, the Rx signal being a second signal received by the Rx, wherein the calibrating the Rx signal is performed independently from the calibrating the Tx signal.

Implementations of these aspects include one or more of the following features in some implementations. For example, the reference signal includes actual real-time data traffic of a wireless communication network, and the calibrating of the Tx signal is performed concurrently with the calibrating of the Rx signal.

In some implementations, one or more of a delay alignment, a phase alignment and a gain alignment of the reference signal and the loopback signal are performed so that the reference signal and the loopback signal have compatible time delays, phases and gains, respectively.

In some implementations, the set of Tx I/Q mismatch parameters include image components and local oscillator (LO) leakage components caused by the Tx I/Q mismatch, and the set of Rx I/Q mismatch parameters include image components and LO leakage components caused by the Rx I/Q mismatch.

In some implementations, determining a set of Tx I/Q mismatch parameters and a set of Rx I/Q mismatch parameters includes determining a set of time-domain Tx I/Q mismatch parameters and a set of time-domain Rx I/Q mismatch parameters that correspond to a frequency-dependent Tx I/Q mismatch and a frequency-dependent Rx I/Q mismatch, respectively.

In some implementations, determining a set of Tx I/Q mismatch parameters and a set of Rx I/Q mismatch parameters based on the reference signal and the loopback signal includes using a finite impulse response (FIR) filter estimation method to estimate one or more time-domain taps of the set of Tx I/Q mismatch parameters and the set of Rx I/Q mismatch parameters based on the reference signal and the loopback signal in a time domain.

In some implementations, the additional signal includes a first phase shift that is applied to a Rx LO frequency sinusoidal signal and a second, different phase shift that is applied to the Rx LO frequency sinusoidal signal, and the loopback signal includes: a first signal that results from down-converting a Tx local oscillator (LO) frequency signal based on the Rx LO frequency sinusoidal signal that is shifted by the first phase shift, wherein the Tx LO frequency signal results from up-converting the reference signal to a Tx LO frequency; and a second signal that results from down-converting the Tx LO frequency signal based on the Rx LO frequency sinusoidal signal that is shifted by the second, different phase shift.

In some implementations, the additional signal includes a predetermined frequency offset that is applied to a Rx LO frequency sinusoidal signal, and the loopback signal includes a signal that results from down-converting a Tx local oscillator (LO) frequency signal based on the Rx LO frequency sinusoidal signal that is shifted by the predetermined frequency offset relative to a Tx LO frequency, wherein the Tx LO frequency signal results from up-converting the reference signal to the Tx LO frequency.

The described systems and techniques are suitable to be implemented in electronic circuitry, computer hardware, firmware, software, or in combinations of them, such as the structural means disclosed in this specification and structural equivalents thereof. In some implementations, this includes at least one computer-readable medium embodying a program operable to cause one or more communication apparatus (e.g., a signal processing device including a programmable processor) to perform operations described. Thus, program implementations are suitable to be realized from a disclosed method, system, or apparatus, and apparatus implementations are suitable to be realized from a disclosed system, computer-readable medium, or method. Similarly, method implementations are suitable to be realized from a disclosed system, computer-readable medium, or apparatus, and system implementations are suitable to be realized from a disclosed method, computer-readable medium, or apparatus.

For example, the disclosed embodiment(s) below are suitable to be implemented in various systems and apparatus, including, but not limited to, a special purpose communication apparatus (e.g., a wireless access point, a remote environment monitor, a router, a switch, a computer system component, or a medium access unit), a mobile communication apparatus (e.g., a wireless client, a cellular telephone, a personal digital assistant (PDA), a mobile computer, or a digital camera), a general purpose communication apparatus (e.g., a minicomputer, a server, a mainframe, or a supercomputer), or combinations of these.

The disclosed technologies result in one or more of the following potential advantages. For example, in some instances, the described systems and techniques provide more accurate and reliable calibration of I/Q mismatches in wireless communication systems. In some instances, the described systems and techniques support frequency-dependent I/Q mismatch calibration, and are used for wideband radio frequency (RF) transceivers. The described systems and techniques allow the transmitter (Tx) and receiver (Rx) to be calibrated simultaneously and independently. In some instances, the described systems and techniques are implemented using minor analog or RF circuit changes, and with low computational complexity. In some instances, the described systems and techniques support calibration with actual traffic signals during normal transmitting operation, without requiring dedicated training signal and reserved training period, and can improve the traffic throughput.

Details of one or more implementations are set forth in the accompanying drawings and the descriptions below. Other features and advantages will be apparent from the description and drawings, and from the claims.

DRAWING DESCRIPTIONS

DETAILED DESCRIPTION

Figure 1:
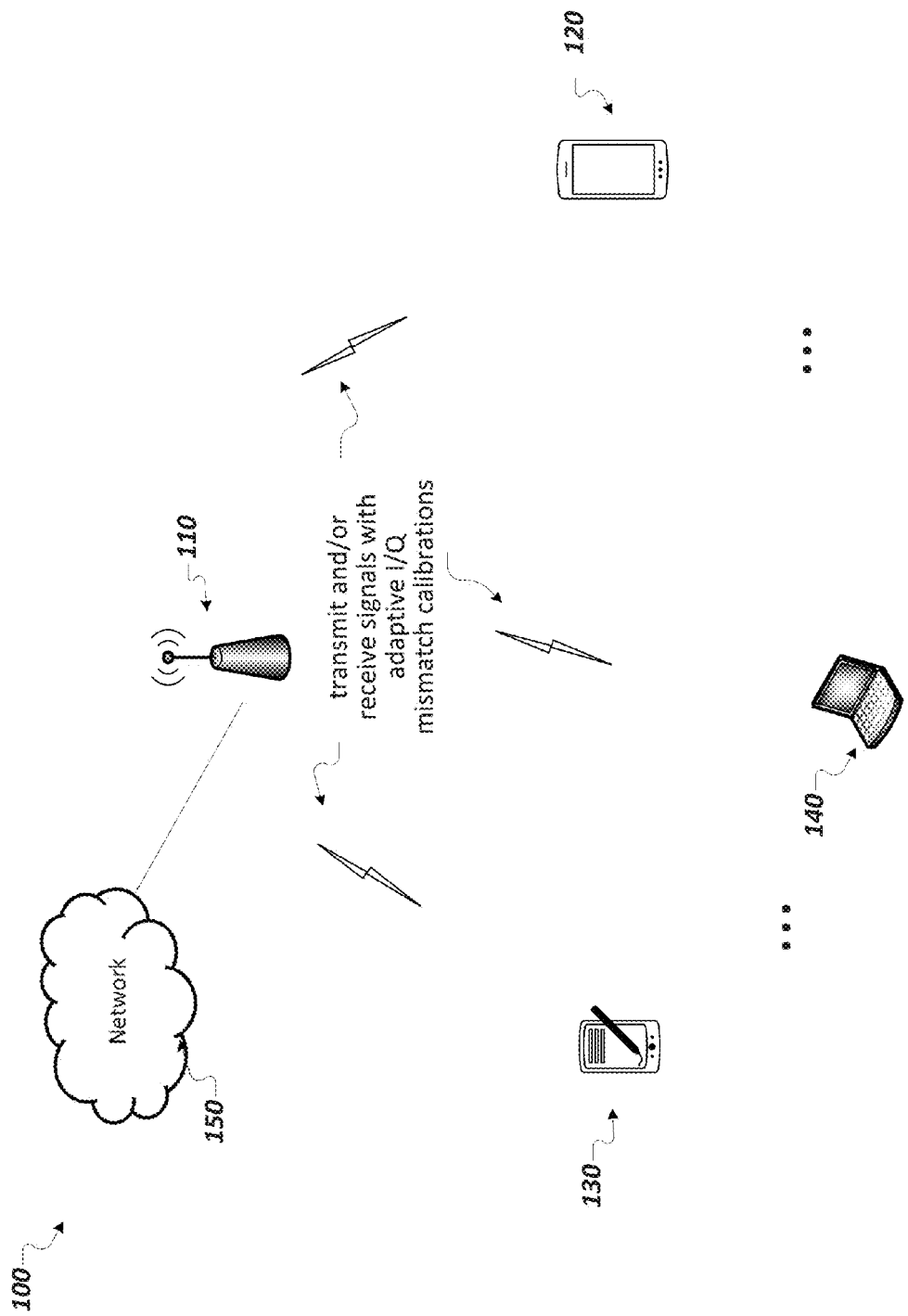
FIG. 1 is a pictorial diagram showing an example of a communication system.

The systems and techniques described herein are suitable to be implemented using one or more devices, such as one or more integrated circuit (IC) devices, in a communication device (e.g., a wireless communication device, a wireline communication device, an electronic data storage device, or a channel medium access access/control device). For example, the systems and techniques disclosed are suitable to be implemented in a wireless local area network (WLAN) transceiver device (e.g., a WLAN chipset).

With the increasing data traffic demands, wireless communication systems have been developing to support higher-order modulation schemes (e.g., 1024 quadrature amplitude modulation (QAM)), multi-user-multiple-input-and-multiple-output (MU-MIMO) operations (e.g., 4-stream MIMO), and wider bandwidth (e.g., 160 MHz bandwidth (BW) in the Institute of Electrical and Electronics Engineers (IEEE) 802.11ac standard). The higher modulation order, more antenna paths, and/or wider bandwidth impose more challenges and elevated requirements for I/Q mismatch calibrations.

This disclosure describes adaptive I/Q mismatch calibration methods that offer more accurate and reliable calibrations to meet the elevated requirements of wireless communication systems. Unlike existing I/Q mismatch calibration methods, such as a foreground calibration method using a single tone or frequency-independent calibration method, in various embodiments the adaptive calibration methods described herein improve a device's sensitivity to supply and temperature variation and vulnerability to I/Q low pass filter (LPF) cutoff frequency mismatch. For example, the proposed adaptive calibration methods estimate or otherwise determine calibration parameters (or I/Q mismatch parameters) in the time domain, for example, in terms of multiple time-domain tabs reflecting the effect of the I/Q mismatch on the signal. The multiple time-domain tabs capture the frequency-selective I/Q mismatches, in an embodiment. As such, the proposed adaptive calibration methods are suitable to be used in a wideband wireless communication system for calibrating frequency-selective I/Q mismatches.

Existing I/Q mismatch calibration methods calibrate either Tx or Rx first, and use one as a reference to calibrate the other. As a result, the quality of the later calibration is bounded by the quality of the earlier calibration. The proposed adaptive calibration methods calibrate the Tx and Rx independently, in an embodiment, such that in accordance with examples of adaptive calibration method described herein, an earlier calibrated signal (e.g., a calibrated Tx signal) is not used as a reference to determine calibration parameters of a later calibrated signal (e.g., a Rx signal). Instead, in accordance with adaptive calibration methods described herein, respective calibration parameters (or I/Q mismatch parameters) for the Tx signal and the Rx signal are computed simultaneously. In an embodiment, the determined calibration parameters are applied to the Tx signal and the Rx signals independently such that performance degradations in one path or circuit need not have an impact on the other. For example, the proposed adaptive calibration methods calculate or otherwise determine respective calibration parameters for the Tx and the Rx based on a reference signal and a corresponding loopback signal. The loopback signal includes additional information or signal (e.g., in terms of one or more of a phase shift or a frequency offset) that allows a communication apparatus to distinguish the I/Q mismatch introduced by the Tx (Tx I/Q mismatch) from the I/Q mismatch introduced by the Rx (Rx I/Q mismatch). Based on the distinction provided by the additional signal that is introduced into the loopback signal, calibration parameters for the Tx I/Q mismatch and calibration parameters for Tx I/Q mismatch are distinctively determined at the same time, in an embodiment. In some implementations, calibrations of (i.e., application of the determined respective calibration parameters to) the Tx signal and the Rx signal are performed simultaneously or otherwise concurrently. In some other implementations, for example, in a time division duplex mode (TDD), calibration of the Tx signal is performed on a to-be-transmitted Tx signal as soon as the calibration parameters for the Tx I/Q mismatch are determined; while the calibration parameters for the Rx I/Q mismatch are saved and then applied until a Rx signal is received.

In some implementations, the adaptive calibration methods perform on-line or real-time calibration that operates on real traffic signals (i.e., the actual data communications) and need not use any dedicated calibration time (i.e., a substantive calibration phase that is separate from a communication phase). For example, the adaptive calibration methods determine the calibration parameters based on a reference signal that includes actual data traffic of a wireless communication network, in an embodiment. In some implementations, the calibration parameters are determined constantly, regularly, periodically, or from time to time. As an example, the reference signal that includes real-time actual data traffic carries up-to-date information of current Tx I/Q mismatch and the Rx I/Q mismatch. In this case, the adaptive calibration methods dynamically determine up-to-date Tx I/Q mismatch parameters and Rx I/Q mismatch parameters based on the current reference signal and its correspond loopback signal and calibrate the Tx signal and Rx signal based on the up-to-date Tx I/Q mismatch parameters and Rx I/Q mismatch parameters. As such, the adaptive calibration methods are capable of tracking process, voltage and temperature (PVT) variations. The adaptive calibration methods achieve additional or different advantages in some implementations.

FIG. 1 is a pictorial diagram showing an example of a wireless communication system 100. For instance, the communication system 100 represent a wireless local area network (WLAN) system, a cellular system, a satellite communication system, a near-field communication system, a machine-to-machine communication system, or other type of communication system. As an example, the system 100 is a WiFi system.

As illustrated, the communication system 100 includes multiple wireless communication devices 110, 120, 130, and 140 that communicate over one or more wireless channels. For example, when operating in an infrastructure mode, a wireless communication device 110 represents an access point (AP) that provides connectivity with a network 150, such as the Internet, to other wireless communication devices 120, 130, and 140, e.g., client stations, access terminals (AT), or wireless stations (STAs).

Various examples of the wireless communication devices include mobile phones, smart phones, wireless routers, wireless hubs, etc. In some cases, wireless communication electronics are integrated with data processing equipment such as laptops, personal digital assistants, and computers.

In some implementations, one or more of the wireless communication devices 110, 120, 130, and 140 transmit signals using large modulation sizes (e.g., 1024 QAM), via multiple antennas (e.g., MIMO), and/or over a wide bandwidth (e.g., over a 80 MHz or 160 MHz frequency band). In some implementations, the one or more of the wireless communication devices 110, 120, 130, and 140 are configured to perform the proposed adaptive I/Q mismatch calibration to achieve more accurate and reliable I/Q mismatch calibrations and to transmit and/or receive signals with adaptive I/Q mismatch calibrations so that a desired bit error performance or other quality of service (QoS) requirements are satisfied.

Figure 2:
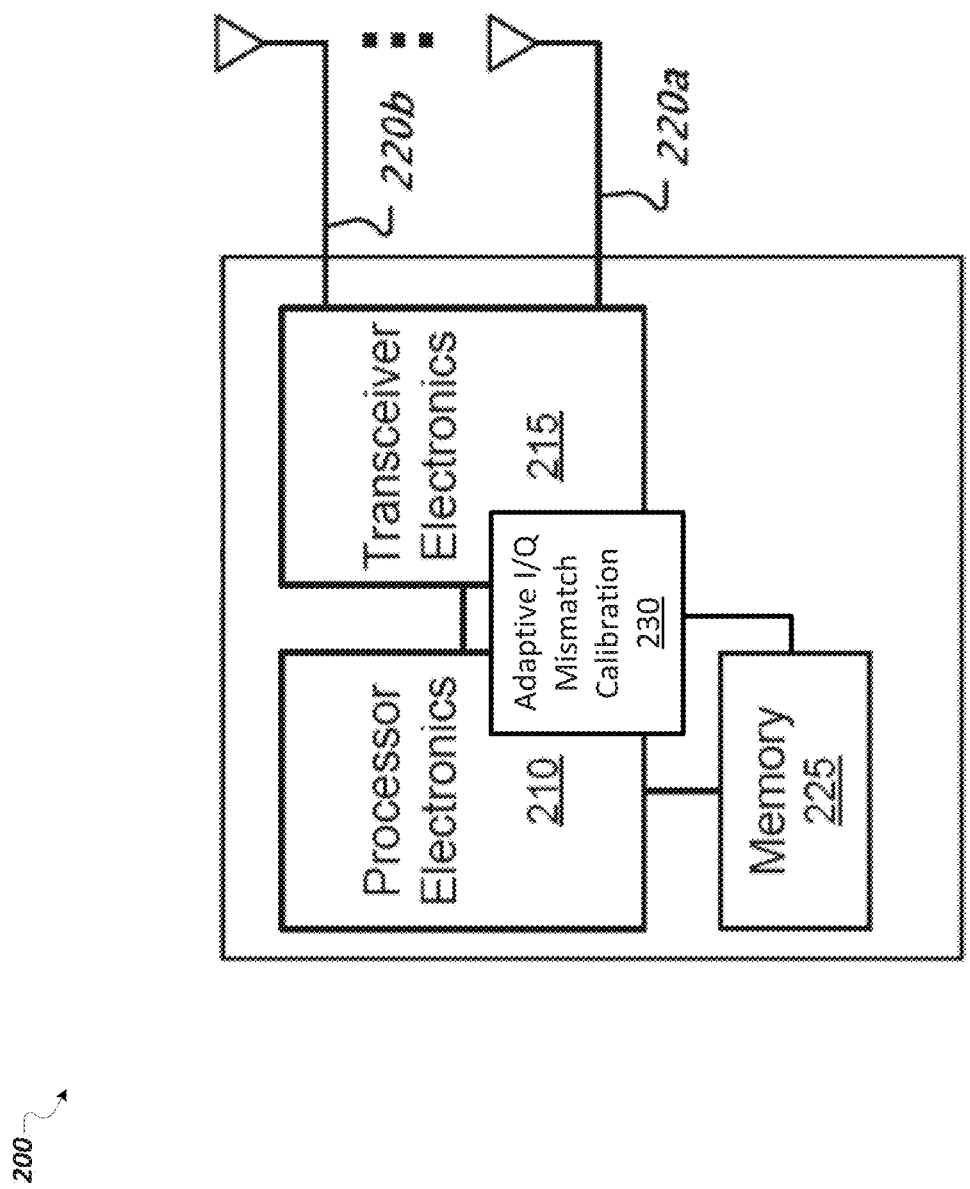
FIG. 2 shows a block diagram of a wireless communication device of the communication system 100 in FIG. 1, according to an implementation.

FIG. 2 shows a block diagram of a wireless communication device 200 of the wireless communication system 100 in FIG. 1, according to an implementation. For example, the device 200 represents one or more of the wireless communication devices 110, 120, 130, and 140 in FIG. 1 or another device. Various examples of the device 200 include an access point (AP), a base station (BS), an access terminal (AT), a client station, or a mobile station (MS).

As illustrated, the device 200 includes processor electronics 210, such as one or more processors that implement methods effecting the techniques presented in this disclosure. In some implementations, the processor electronics 210 are operable to execute computer-readable instructions that, when executed on the processor electronics 210, cause the device 200 to implement methods affecting the techniques presented in this disclosure. For example, the processor electronics 210 cause the device 200 to perform adaptive I/Q mismatch calibration to compensate frequency-dependent I/Q mismatches in an RF transceiver.

The device 200 includes transceiver electronics 215 (e.g., a transmitter, receiver, or transceiver) to send and/or receive wireless signals over one or more antennas 220a-220b. In some implementations, transceiver electronics 215 include multiple radio units. In some implementations, a radio unit includes a baseband unit (BBU) and a radio frequency unit (RFU) to transmit and receive signals. In some implementations, the device 200 includes dedicated circuitry for transmitting (e.g., a dedicated transmitter) and dedicated circuitry for receiving (e.g., a dedicated receiver). In some implementations, transceiver electronics 215 include some or all components of RF transceivers 300 or 600 shown in FIGS. 3 and 6, respectively.

As illustrated, the device 200 includes one or more memories 225 configured to store information such as data and/or instructions (e.g., computer-readable instructions that cause the device 200 to implement methods effecting the techniques presented in this disclosure). For example, the memories 225 stores computer-readable instructions that cause the device 200 to perform adaptive I/Q mismatch calibration, in an embodiment.

As illustrated, the device 200 includes an adaptive I/Q mismatch calibration module 230 that includes some or all components of the processor electronics 210 and transceiver electronics 215. In some implementations, the calibration module 230 is configured to perform adaptive I/Q mismatch calibration according to the example techniques described in FIGS. 4-7 below, for example adaptive I/Q mismatch calibration of a Tx path, a Rx path or both the Tx and Rx paths independently of each other.

Figure 3:
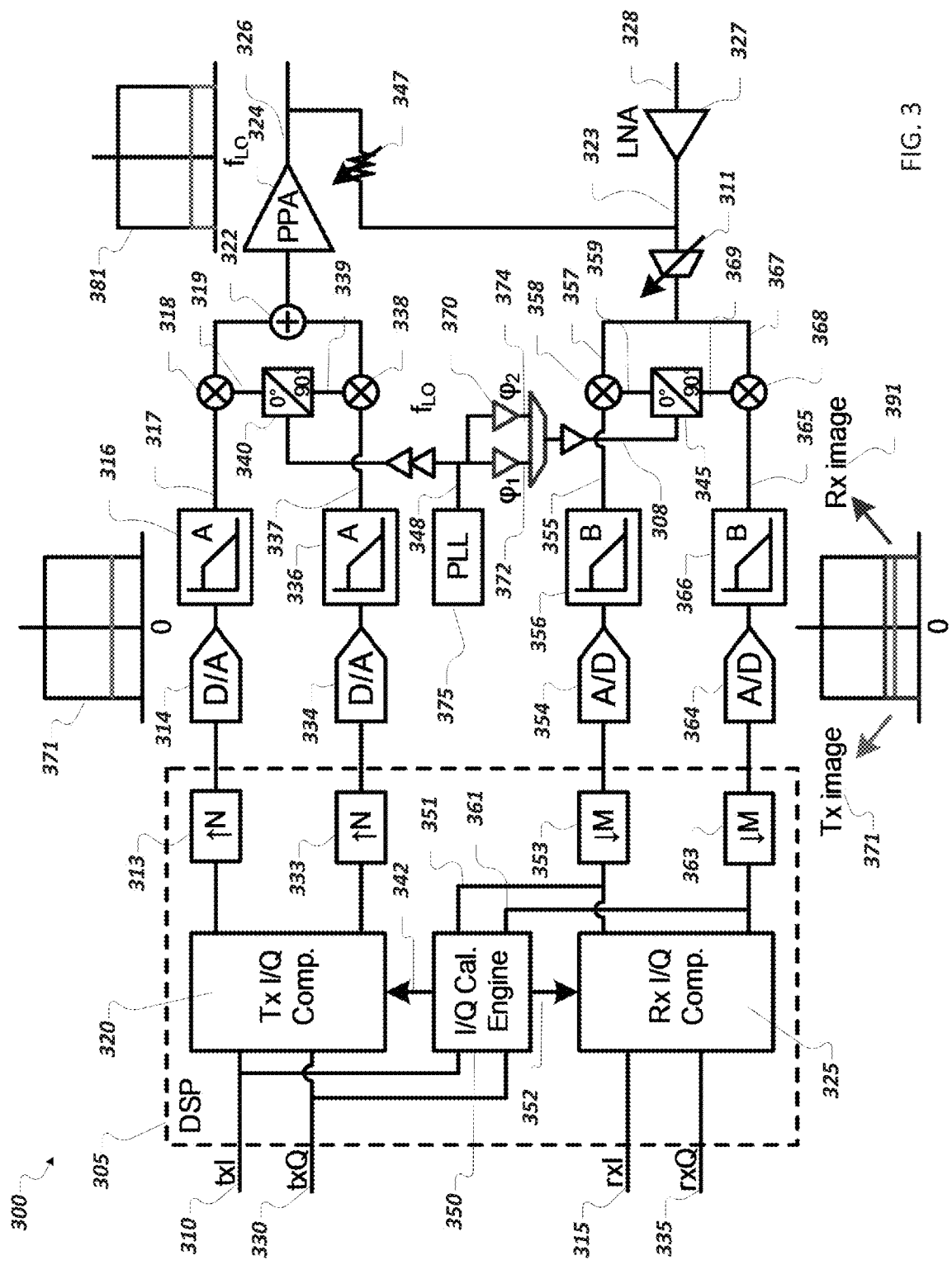
FIG. 3 shows an RF transceiver of the wireless communication device 200 in FIG. 2 that is capable of performing adaptive I/Q mismatch calibration, according to an implementation.

FIG. 3 shows an RF transceiver 300 of the wireless communication device 200 in FIG. 2 that is capable of performing adaptive I/Q mismatch calibration, according to an implementation. For example, the RF transceiver 300 represents the calibration module 230 of the wireless communication device 200 in FIG. 2. In some implementations, the RF transceiver 300 represents a wideband TDD RF transceiver. The RF transceiver 300 includes a digital signal processor (DSP) 305, a transmitting branch (also referred to as a Tx), and a receiving branch (also referred to as a Rx). In some implementations, the RF transceiver 300 includes additional or different components or has a different configuration than that shown in FIG. 3.

The transmitting branch includes Tx electronics such as digital to analog converters (D/As) 314 and 334, low-pass filters (LPFs) 316 and 336, an up-conversion mixer 340, and a power amplifier 324. The transmitting branch converts baseband signals (e.g., output from the DSP 305) to RF signals, for example, for transmitting over the air.

The receiving branch includes Rx electronics such as a low noise amplifier (LNA) 327, a down-conversion mixer 345, low-pass filters 356 and 366, and analog to digital converters (A/Ds) 354 and 364. The receiving branch converts a received RF signal into a baseband signal, for example, for baseband processing by the DSP 305.

The RF transceiver 300 includes a local oscillator (LO) 375 for generating signals of an LO frequency ($f_{LO}$). As an example, the LO 375 includes a phase lock loop (PLL) for generating a LO frequency sinusoidal signal 348. The LO frequency sinusoidal signal 348 is fed into the mixers 340 and 345 for generating respective quadrature sinusoidal signals that are, ideally, 90 degrees from the LO frequency sinusoidal signal 348. For example, the mixer 340 outputs the LO frequency sinusoidal signal 348 as an in-phase Tx LO frequency sinusoidal signal 319 and the ideally 90-degree-phase-shifted sinusoidal signal 339 as a quadrature Tx LO frequency sinusoidal signal 339, for up-converting a baseband Tx signal into a Tx LO frequency signal. Similarly, the mixer 345 outputs the LO frequency sinusoidal signal 348 as an in-phase Rx LO frequency sinusoidal signal 359 and the ideally 90-degree-phase-shifted sinusoidal signal as a quadrature Rx LO frequency sinusoidal signal 369, for down-converting a received RF signal into a Rx LO frequency signal.

In some instances, the phase of in-phase Tx and Rx LO frequency sinusoidal signals 319 and 359 is not exactly 90 degrees from the quadrature Tx and Rx LO frequency sinusoidal signals 339 and 369, respectively. Additionally or alternatively, in some instances, the amplitudes of in-phase Tx and Rx LO frequency sinusoidal signals 319 and 359 are not the same as those of the quadrature Tx and Rx LO frequency sinusoidal signal 339 and 369, respectively. As a result, I/Q mismatches occur. In some implementations, other circuit components, such as the power amplifiers 324 and 327 and LPFs 316, 336, 356 and 366, also introduce distortion or impairments that contribute to the I/Q mismatch, causing degradations of the transmitted and/or received signals. The I/Q mismatch experienced by the transmitted signal is referred to as a Tx I/Q mismatch, while the I/Q mismatch experienced by the received signal is referred to as a Rx I/Q mismatch.

In some implementations, the DSP 305 is used to perform adaptive calibration to compensate the Tx I/Q mismatch and the Rx I/Q mismatch. The DSP 305 includes a Tx I/Q compensation unit 320, a Rx I/Q compensation unit 325, and an I/Q calibration engine 350. The DSP 305 calibrates the Tx and Rx I/Q mismatch in the digital domain. In some implementations, the DSP 305 performs Tx mismatch calibration and Rx I/Q mismatch concurrently and independently, for example, by the Tx I/Q compensation unit 320 and the Rx I/Q compensation unit 325, respectively.

In some operations, for the transmitting branch, the DSP 305 receives a digital in-phase signal or sequence (also referred to as a digital transmitted I (txI) signal 310) and a digital quadrature signal or sequence (also referred to as a transmitted Q (txQ) signal 330). As an example, the digital txI signal 310 and txQ signal 330 are the in-phase and quadrature components of a digitally modulated signal (e.g., a 1024 QAM signal) output from a modulator (not shown in FIG. 3).

In some implementations, a copy of the digital txI signal 310 and txQ signal 330 is input into the I/Q calibration engine 350 as reference signals for estimating or otherwise determining the I/Q mismatch. In some implementations, the digital txI signal 310 and txQ signal 330 are used as training signals (e.g., made known to the I/Q calibration engine 350). The I/Q calibration engine 350 determines I/Q mismatch parameters 342 of the transmitted signal, for example, TX I/Q mismatch-induced image components and LO leakage components of the transmitted signal, and send the determined Tx I/Q mismatch parameters 342 to the Tx I/Q compensation unit 320. Typically, image components are the additional signal or distortion signals generated by I/Q mismatch or imbalance. The LO leakage components includes one or more additional sine waves at an output of a mixer (or a frequency multiplier), which are introduced by the local oscillator directly feeding through a sine wave from the mixer's input to output in the TX, RX, or both. In some implementations, the use of a known reference signal guarantees good signal to noise ratio (SNR) and small interference. Compared to the blind I/Q mismatch calibration method, the proposed adaptive I/Q mismatch calibration method obtains higher estimation and compensation accuracy in various instances.

In some implementations, the Tx I/Q compensation unit 320 performs TX I/Q compensation of ensuing txI signal 310 and txQ signal 330 based on the determined Tx I/Q mismatch parameters 342. After compensation, the txI signal and txQ signal are N times up-sampled by respective up-samplers 313 and 333, and output from the DSP 305.

The up-sampled digital I and Q signals are converted to analog signals by respective D/As 314 and 334, and pulse-shaped by respective low path filters 316 and 336, resulting in a baseband analog txI signal 317 and a baseband analog txQ signal 337, respectively. The baseband analog transmitted signals 317 and 337 have a frequency spectrum 371 centered at the direct current (DC).

The baseband analog signal is then modulated onto the LO frequency. For example, the baseband analog txI signal 317 is multiplied by the in-phase Tx LO frequency sinusoidal signal 319 at the frequency multiplier 318, while the baseband analog txQ signal 337 is multiplied by the quadrature LO frequency sinusoidal signal 339 at the frequency multiplier 338. The multiplied txI and txQ signals are combined at an adder 322 and passed through a Pre-Power Amplifier (PPA) 324, resulting in a Tx LO frequency signal 326 that has a frequency spectrum 381 centered at the LO frequency $f_{LO}$. In some implementations, the PPA is a power amplifier driver used to driving external power amplifier, if there is one. In some implementations, the PPA is a power amplifier, without the need of an external one. In some implementations, the Tx LO frequency signal 326 is further modulated onto an RF frequency and transmitted by an antenna (not shown).

In the receiving branch of the RF transceiver 300, an RF signal 328 is received by an antenna (not shown). In some instances, the received RF signal 328 is weak and is passed to the LNA 327 for amplification while adding as little noise as possible. The resulting amplified RF signal 323 is passed through a variable gain amplifier (VGA) 311 to further amplify the received signal to fit ADC input swing range, and down-converted by the mixer 345 using the LO frequency. In some implementations, the use of VGA is to make sure the signal strength present in front of ADC is or approximates a best-fit to the input range of the ADC, regardless of the received signal strength at LNA input. The in-phase component 357 of the amplified received RF signal 323 is multiplied with the in-phase Rx LO frequency sinusoidal signal 359 at a frequency multiplier 358, resulting in a received in-phase (rxI) signal. The quadrature component 367 of the amplified received RF signal 323 is multiplied with the corresponding quadrature Rx LO frequency sinusoidal signal 369 at a frequency multiplier 368, resulting in a received quadrature (rxQ) signal. The rxI and rxQ signals are then filtered by the LPFs 356 and 366 and result in baseband rxI and rxQ signals, respectively. The baseband rxI and rxQ signals are digitized by the A/Ds 354 and 364 into digital rxI and rxQ signals, respectively, which are input into the DSP 305 for digital signal processing.

The DSP 305 receives the digital rxI and rxQ signals and down-samples them M times by respective down-samplers 353 and 363. The down-sampled digital rxI and rxQ signals are fed into the Rx I/Q compensation unit 325 and output from the DSP 305 as the compensated or calibrated rxI and rxQ signals 315 and 335, respectively. In some implementations, the compensated rxI and rxQ signals 315 and 335 are demodulated to decode the received data.

The Rx I/Q compensation unit 325 performs adaptive Rx I/Q mismatch calibration based on Rx I/Q mismatch parameters 352 that are determined by the I/Q calibration engine 350. In some implementations, the I/Q calibration engine 350 determines the Rx I/Q mismatch parameters 352 based on one or more loopback signals (e.g., including an in-phase loopback signal 351 and a quadrature loopback signal 361) that carry or otherwise include both the Rx and Tx I/Q mismatches. The one or more loopback signals are generated, for example, by passing a copy of the Tx LO frequency signal 326 through the transmitting branch, being fed back or looped back through variable attenuator 347 and variable gain amplifier 311, further through the same receiving branch circuitry that is passed through by a received RF signal (e.g., the amplified received RF signal 323). In some implementations, the resulting loopback signal corresponding to the Tx LO frequency signal 326 includes both the Tx I/Q mismatch introduced by the transmitting branch and the Rx I/Q mismatch introduced by the receiving branch. The resulting loopback signal further include one or more additional signals that distinguish the Tx I/Q mismatches from the Rx I/Q mismatches. As such, respective parameters corresponding to the Rx and Tx I/Q mismatches are determined, for example, by the DSP (e.g., the I/Q calibration engine 350), in an embodiment.

In some implementations, to distinguish the Tx I/Q mismatch and Rx I/Q mismatch, a phase-shifter 370 is added in the Rx LO circuit. Compared to adding a phase-shifter in the receiving branch circuitry, adding the phase-shifter 370 to the Rx LO circuit only requires a narrowband phase shifter, thus avoiding challenges and costs associated with designing a phase shifter having constant phase shift across a wide bandwidth and degradation of the calibration accuracy.

In some implementations, the phase-shifter 370 introduces two different phase shifts, $\phi 1$ and $\phi 2$, to the LO frequency sinusoidal signal 348 before generating the Rx LO I/Q sinusoidal signals at the mixer 345. In some implementations, the phase-shifter 370 switches between the two different phase shift values at different time instances. In some implementations, the phase-shifter 370 includes two or more phase-shifters to provide two or more different phase shift values. The introduction of the phase shifts, $\phi 1$ and $\phi 2$ to the Rx LO I/Q sinusoidal signals causes the resulting phase-shifted Rx LO I/Q sinusoidal signals to be distinguishable from the Tx LO I/Q sinusoidal signal, and thus allows the I/Q calibration engine 350 to distinguish the Tx I/Q mismatches from the Rx the I/Q mismatches and to determine the Tx I/Q mismatch parameters and the Rx I/Q mismatch parameters at the same time.

For example, at a first time instance, the LO frequency sinusoidal signal 348 generated by the PLL 375 passes through the phase-shifter 370 and results in a first Rx LO frequency sinusoidal signal 372 that is shifted by a first phase shift $\phi 1$ relative to the LO frequency sinusoidal signal 348. At a second time instance, the LO frequency sinusoidal signal 348 passes through the phase-shifter 370 and results in a second Rx LO frequency sinusoidal signal 374 that is shifted by a second phase shift $\phi 2$ relative to the LO frequency sinusoidal signal 348.

In some implementations, the phase shifted Rx LO frequency sinusoidal signal 372 or 374 is fed into the mixer 345. The mixer 345 outputs a phase-shifted Rx LO frequency sinusoidal signal and its corresponding quadrature sinusoidal signal, which serve as the new in-phase and quadrature Rx LO frequency sinusoidal signals 359 and 369, respectively. In some implementations, the phase-shifted in-phase and quadrature Rx LO frequency sinusoidal signals 359 and 369 is multiplied with, for example, the in-phase and quadrature components of the Tx LO frequency signal 326 that is looped back to the receiving branch, resulting in analog loopback in-phase (lbI) signal 355 and quadrature (lbQ) signal 365, respectively. Since the Rx LO frequency sinusoidal signal shares the same LO frequency as the Tx LO frequency signal 316, the Tx LO frequency signal 326 is down-converted to a baseband loopback signal (including the lbI signal 355 and lbQ signal 365) with a received signal spectrum or Rx image 391 centered at DC. Compared to the baseband transmitted signal spectrum or Tx image 371 corresponding to the Tx LO frequency signal 326 (i.e., before up-converting the baseband analog transmitted signals 317 and 337 to the Tx LO frequency), the Tx image 371 and the Rx image 391 differ in the phase due to the introduced phase shift $\phi_1$ or $\phi_2$.

The lbI signal 355 and lbQ signal 365 are further filtered by the LPFs 356 and 366, digitized by the A/Ds 354 and 364, and down sampled M times by the respective down-samplers 353 and 363. The down-sampled digital lbI and lbQ signals 351 and 361 are input into the I/Q calibration engine 350 for estimating or otherwise determining the I/Q mismatch parameters (for example, in terms of image components and LO leakage components). In some implementations, the Rx I/Q compensation unit 325 receives and applies the determined Rx I/Q mismatch parameters 352 for compensating the received signals (e.g., the rxI signal and rxQ signal), resulting in compensated or calibrated rxI signal 315 and rxQ signal 335 output from the DSP 305.

Figure 4:
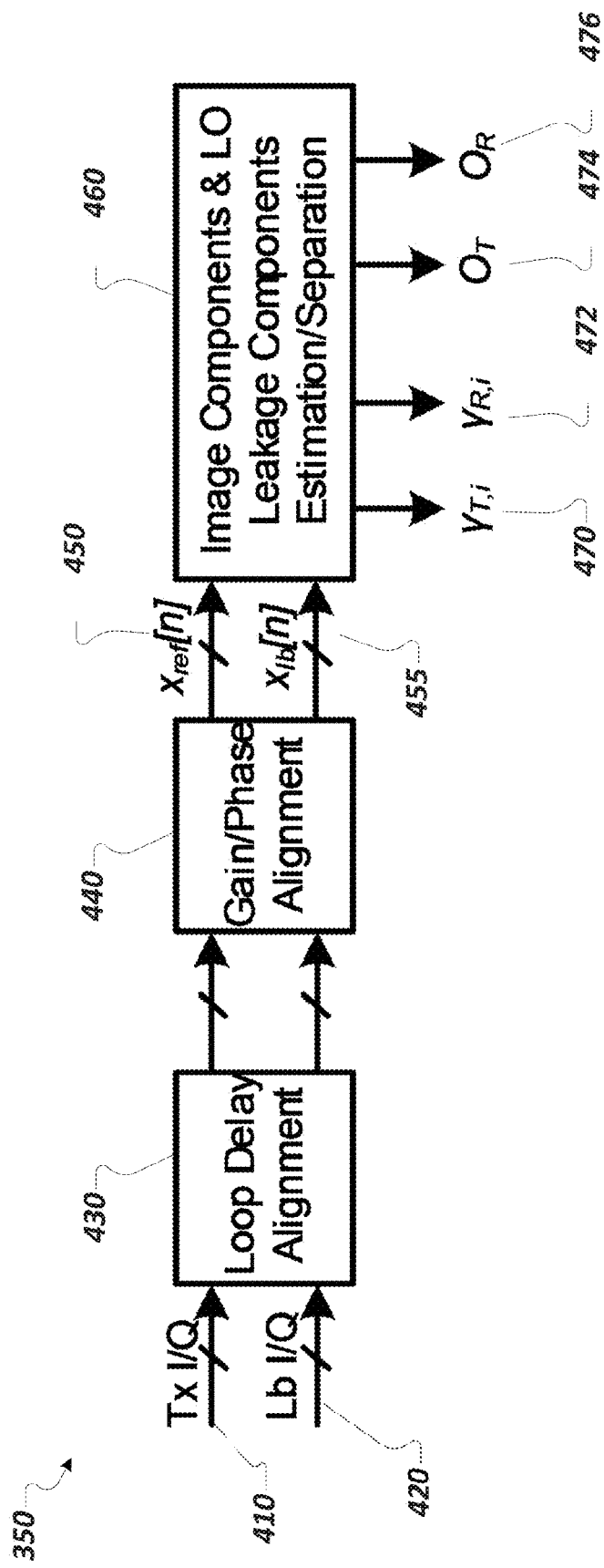
FIG. 4 shows a block diagram of the I/Q calibration engine 350 in FIG. 3, according to an implementation.

FIG. 4 shows a block diagram of the I/Q calibration engine 350 in FIG. 3, according to an implementation. As illustrated, the I/Q calibration engine 350 includes a loop delay alignment unit 430, a gain/phase alignment unit 440, and an estimation unit 460. In some implementations, an I/Q calibration engine 350 includes additional or different units or components. In some implementations, the I/Q calibration engine 350 is implemented by hardware, software, or a combination thereof. For example, the I/Q calibration engine 350 is implemented by a radio frequency integrated circuit (RFIC), a field-programmable gate array (FPGA), or a register transfer language (RTL) code or other code that runs on a DSP (e.g., the DSP 305 in FIG. 3), in an embodiment.

In some implementations, the I/Q calibration engine 350 receives a reference signal (e.g., Tx I/Q signals 410) and a loopback signal (e.g., loopback I/Q signals 420) corresponding to the reference signal. For example, the Tx I/Q signals 410 include the txI signal 310 and txQ signal 330 that are the in-phase and quadrature components of a digitally modulated signal (e.g., a 1024 QAM signal) output from a modulator. In some implementations, the loopback I/Q signals 420 include the lbI and lbQ signals 351 and 361 that are the digital in-phase and quadrature components of a loopback signal corresponding to the Tx LO frequency signal 326 generated based on the txI signal 310 and txQ signal 330.

In some implementations, the loop delay alignment unit 430 performs delay alignment between input signals, for example, based on correlations of the input signals so that the input signals are aligned in the delay domain (so that the input signals are synchronized or have the same, substantially the same, or otherwise compatible time delay). As an example, the Tx I/Q signals 410 and loopback I/Q signals 420 are aligned in the delay domain by the loop delay alignment unit 430 to account for the delay or propagation time experienced by the loopback I/Q signals 420. In some implementations, the delay alignment includes integer delay alignment and fractional delay alignment.

In some implementations, the gain/phase alignment unit 440 performs gain and phase alignment of input signals, for example, by normalization and phase shift, respectively, of the input signals. For example, the delay-aligned signals are further gain- and phase-aligned by the gain/phase alignment unit 440 so that the signals having the same, substantially the same, or otherwise compatible gain and phase. As a result, an aligned reference signal $x_{ref}[n]$ 450 and a corresponding loopback signal $x_{lb}[n]$ 455 that are aligned in the delay, amplitude, and phase domains are obtained after passing through the gain/phase alignment unit 440.

In some implementations, the estimation unit 460 estimates or otherwise determines the Rx and/or Tx I/Q mismatch, independently, based on the additional signal that distinguishes the Tx I/Q mismatch from the Rx I/Q mismatch. For example, the estimation unit 460 estimates or separates the image components and LO leakage components caused by the Rx and/or Tx I/Q mismatch. In some implementations, the relationship between the aligned reference signal $X_{ref}[n]$ 450 and loopback signal $x_{lb}[n]$ 455 is represented by Equations (1) and (2), in an embodiment:

$$x_{lb,1}[n] = x_{ref,1}[n] + \sum_{i=0}^{M-1} \gamma_{T,i} x_{ref,1}[n-i]^* + \qquad (1)$$

$$e^{-2j\varphi_1} \sum_{i=0}^{N-1} \gamma_{R,i} x_{ref,1}[n-i]^* + O_T + e^{-j\varphi_1} O_R$$

$$x_{lb,2}[n] = x_{ref,2}[n] + \sum_{i=0}^{M-1} \gamma_{T,i} x_{ref,2}[n-i]^* + \qquad (2)$$

$$e^{-2j\varphi_2} \sum_{i=0}^{N-1} \gamma_{R,i} x_{ref,2}[n-i]^* + O_T + e^{-j\varphi_2} O_R$$

Where $$\gamma_{R,i} = \frac{(C_{1,i} - C_{2,i})e^{2j\varphi_1}}{1 - e^{-2j\varphi}} \qquad (3)$$

$$\gamma_{T,i} = \frac{(C_{2,i} - e^{-2j\varphi}C_{1,i})}{1 - e^{-2j\varphi}} \qquad (4)$$

$$C_{1,i} = \gamma_{T,i} + e^{-2j\varphi_1}\gamma_{R,i} \qquad (5)$$

$$C_{2,i} = \gamma_{T,i} + e^{-2j\varphi_2}\gamma_{R,i} = \gamma_{T,i} + e^{-2j\varphi}e^{-2j\varphi_1}\gamma_{R,i} \qquad (6)$$

$$\varphi = \varphi_2 - \varphi_1 \qquad (7)$$

$$O_R = \frac{(d_1 - d_2)e^{j\varphi_1}}{1 - e^{-j\varphi}} \qquad (8)$$

$$O_T = \frac{(d_2 - e^{-j\varphi}d_1)}{1 - e^{-j\varphi}} \qquad (9)$$

$$d_1 = O_T + e^{-j\varphi_1}O_R \qquad (10)$$

$$d_2 = O_T + e^{-j\varphi_2}O_R. \qquad (11)$$

Here $x_{lb,1}[n]$ represents a first measurement of a loopback signal (e.g., the loopback signal resulting from down-converting the Tx LO frequency signal 326 based on the phase shifted Rx LO frequency sinusoidal signal 372 with the first phase shift $\phi_1$ in FIG. 3) corresponding to a reference signal $x_{ref,1}[n]$ where a first phase shift $\phi_1$ is applied to the Rx LO frequency sinusoidal signal.

In some implementations, the values of the two phase shifts $\phi_1$ and $\phi_2$ are predetermined and hardcoded in the hardware. In some implementations, the values of the two phase shifts $\phi_1$ and $\phi_2$ are determined based on user input or changed from time to time. In some implementations, the difference $\phi$ between the two phase shifts $\phi_1$ and $\phi_2$ are set to 90 degrees. However, the values of, or the difference between, the two phase shifts $\phi_1$ and $\phi_2$ do not have to be precise. In some implementations, the loop delay alignment unit 430 and/or the gain/phase alignment unit 440 estimate or otherwise determine the actual values of the two phase shifts $\phi_1$ and $\phi_2$ of the loopback signal, thus the predetermined values of the two phase shifts $\phi_1$ and $\phi_2$ are not needed by the estimation unit 460 for computing the I/Q mismatch parameters.

Based on the relationship between the aligned reference signal $x_{ref}[n]$ 450 and loopback signal $x_{lb}[n]$ 455, the estimation unit 460 determines the Tx and Rx I/Q mismatch parameters in the time domain, for example, in terms of multiple taps of the I/Q mismatch-induced image components $\gamma_{T,i}$ 470 and $\gamma_{R,i}$ 472 and LO leakage components $O_T$ 474 and $O_R$ 476. The time-domain Tx and Rx I/Q mismatch parameters (e.g., multiple taps of the image components $\gamma_{T,i}$ 470 and $\gamma_{R,i}$ 472 and LO leakage components $O_T$ 474 and $O_R$ 476) capture frequency-selective Tx and Rx I/Q mismatches in the frequency domain, in some implementations.

Various estimation methods are suitable to be performed to determine the sets of the Tx and Rx I/Q mismatch parameters in the time domain. In some implementations, image components $\gamma_{T,i}$ 470 and $\gamma_{R,i}$ 472 and LO leakage components $O_T$ 474 and $O_R$ 476 are estimated according to a finite impulse response (FIR) filter estimation method. For instance, a finite number of image taps (e.g., $C_{1,i}$ and $C_{2,i}$) are predetermined, and the I/Q mismatch-induced image components $\gamma_{T,i}$ 470 and $\gamma_{R,i}$ 472 are estimated according to a recursive least squares (RLS) or least mean square (LMS) method based on Equations (3)-(4). Similarly, a finite number of taps of the LO leakage are predetermined and the LO leakage components $O_T$ 474 and $O_R$ 476 are estimated based on Equations (8)-(9). In some implementations, the number of image taps and the number of taps of the LO leakage are determined based on the bandwidth, the channel condition, or other parameters. In some instances, the LO leakage only have single tap whereas the I/Q mismatch has a few taps, such as 3 to 5 taps in the time domain. In some implementations, the FIR-based I/Q mismatch compensation requires much less computing power and time than fast Fourier transform (FFT)-based frequency-selective I/Q calibration (typically performed in the frequency domain) as the latter requires dedicated I/Q mismatch compensation coefficients for each bin or bin segment after FFT, and requires expensive FFT operation. The FIR-based I/Q mismatch compensation is more computationally efficient.

In some implementations, the estimated I/Q mismatch-induced image components $\gamma_{T,i}$ 470 and $\gamma_{R,i}$ 472 and LO leakage components $O_T$ 474 and $O_R$ 476 are returned as the outputs of the I/Q calibration engine 350 and used to compensate Tx and Rx signals. For example, the estimated image component $\gamma_{T,i}$ 470 and LO leakage component $O_T$ 474 are input into the Tx I/Q compensation unit 320 to compensate the txI signal and txQ signal, resulting in a compensated Tx signal $x_{tx,comp}[n]$ according to Equation (12):

$$x_{tx,comp}[n]=x_{tx}[n]-\Sigma_{i=0}^{M-1}\gamma_{T,i}x_{tx}[n-i]^*-O_T \quad (12)$$

On the other hand, the estimated image component $\gamma_{R,i}$ 472 and LO leakage component $O_R$ 476 are input into the Rx I/Q compensation unit 325 to compensate the rxI signal and rxQ signal, resulting in a compensated Rx signal $x_{rx,comp}[n]$ according to Equation (13):

$$x_{rx,comp}[n]=x_{rx}[n]-\Sigma_{i=0}^{M-1}\gamma_{R,i}x_{rx}[n-i]^*-O_R \quad (13)$$

In some implementations, the calibration parameters (e.g., image components $\gamma_{T,i}$ 470 and $\gamma_{R,i}$ 472 and LO leakage components $O_T$ 474 and $O_R$ 476) are calculated simultaneously, for example, by the I/Q calibration engine 350 based on the reference signal and the loopback signal using the introduced additional phase shifts. The calibration of the transmitted signal and the calibration of received signal are performed independently by applying calibration parameters for the Tx I/Q mismatches and calibration parameters for Rx I/Q mismatches, for example, by the Tx I/Q compensation unit 320 and the Rx I/Q compensation unit 325, respectively. As such, a performance degradation in one of the transmitting branch and the receiving branch does not impact to the other.

Figure 5:
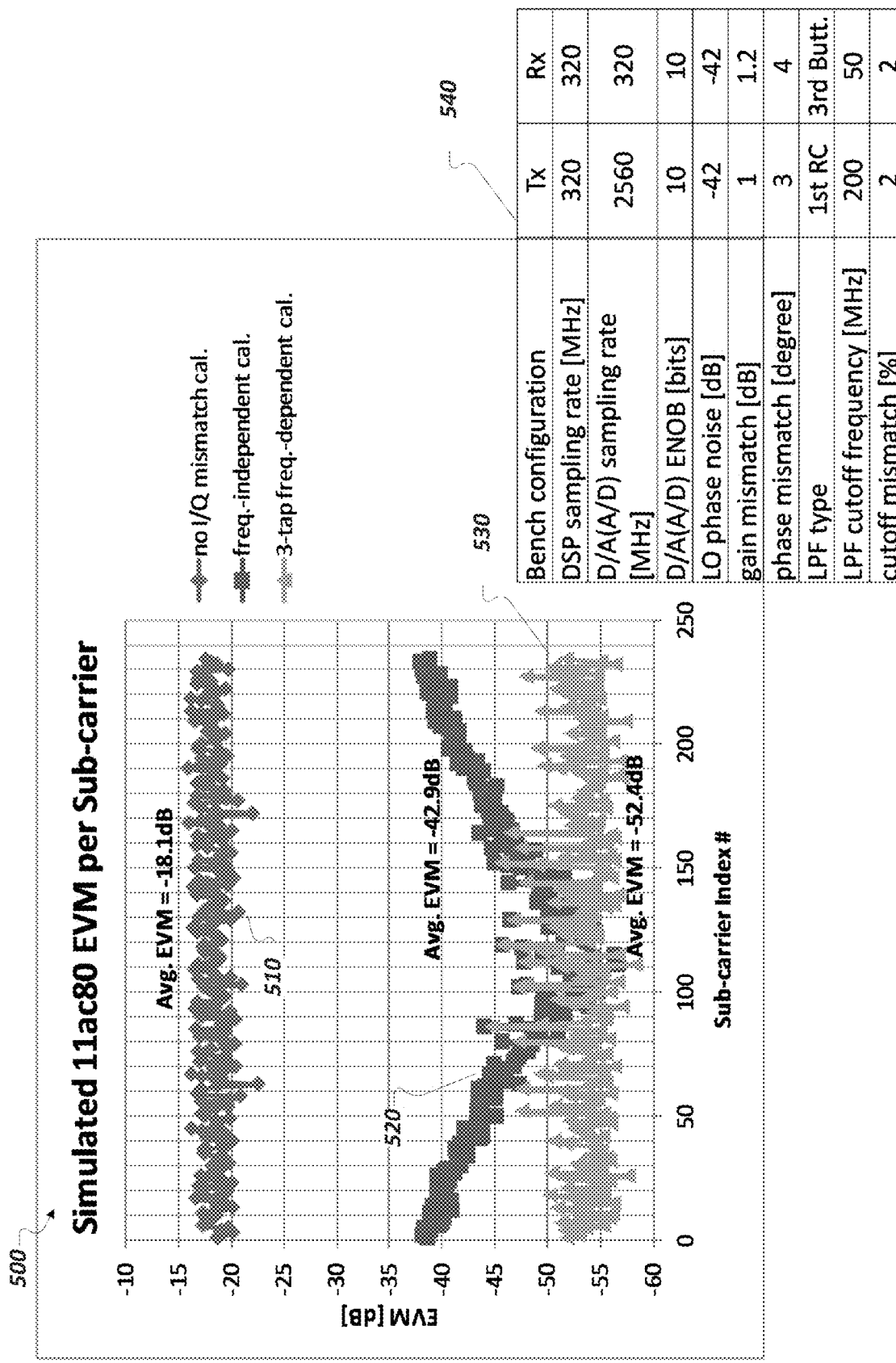
FIG. 5 is a plot showing a simulated error vector magnitude (EVM) performance of the adaptive I/Q mismatch calibration method according to techniques described in connection with FIGS. 3 and 4.

FIG. 5 is a plot 500 showing simulated error vector magnitude (EVM) performance of the adaptive I/Q mismatch calibration method according to the techniques described in connection with FIGS. 3 and 4. EVM is a measurement of modulator or demodulator performance in the presence of impairments such as I/Q mismatches. The simulation parameters are shown in Table 540. For the Tx (e.g., the transmitting branch of the RF transceiver 300 in FIG. 3) and Rx (e.g., the receiving branch of the RF transceiver 300 in FIG. 3), the DSP sampling rates are both 320 MHz. The sampling rate of the D/A (e.g., the D/As 314 and 334) is 2560 MHz, whereas the sampling rate of the A/D (e.g., the A/Ds 354 and 364) is 320 MHz. The effective number of bits (ENOB) of the D/A and A/D are both 10 bits. The phase noise of the LO is −42 dB for both Tx and Rx. The LPF (e.g., LPFs 316 and 336) for the Tx is a $1^{st}$ order resistor-capacitor (RC)LPF with a cutoff frequency of 200 MHz and a cutoff mismatch of 2%, whereas the LPF (e.g., LPFs 356 and 366) for the Rx is a $3^{rd}$ order Butterworth LPF with a cutoff frequency of 50 MHz and a cutoff mismatch of 2%. The Tx I/Q mismatch includes a gain mismatch of 1 dB and a phase mismatch of 3 degrees, while the Rx I/Q mismatch includes a gain mismatch of 1.2 dB and a phase mismatch of 4 degrees. The phase difference between the two phase shifts $\phi_1$ and $\phi_2$ is 80 degrees.

As illustrated in the plot 500, the EVM performance 530 of the adaptive I/Q mismatch calibration method, according to the techniques described in connection with FIGS. 3 and 4, is better than the EVM performance 510 of the case without I/Q mismatch calibration and the EVM performance 520 of the case of an existing I/Q mismatch calibration method that only handles frequency-independent I/Q mismatch. Specifically, the adaptive I/Q mismatch calibration method achieves the lowest average EVM of −52.4 dB, compared to the average EVM of −18.1 dB of the case without I/Q mismatch calibration and the average EVM of −42.9 dB of the case of the existing I/Q mismatch calibration method. Compared to the existing I/Q mismatch calibration method that suffers higher EVMs over a majority of the subcarriers due to its inability to handle frequency-dependent I/Q mismatch, the adaptive I/Q mismatch calibration method band achieves an approximately uniform, low EVM across the subcarriers of the signal.

Figure 6:
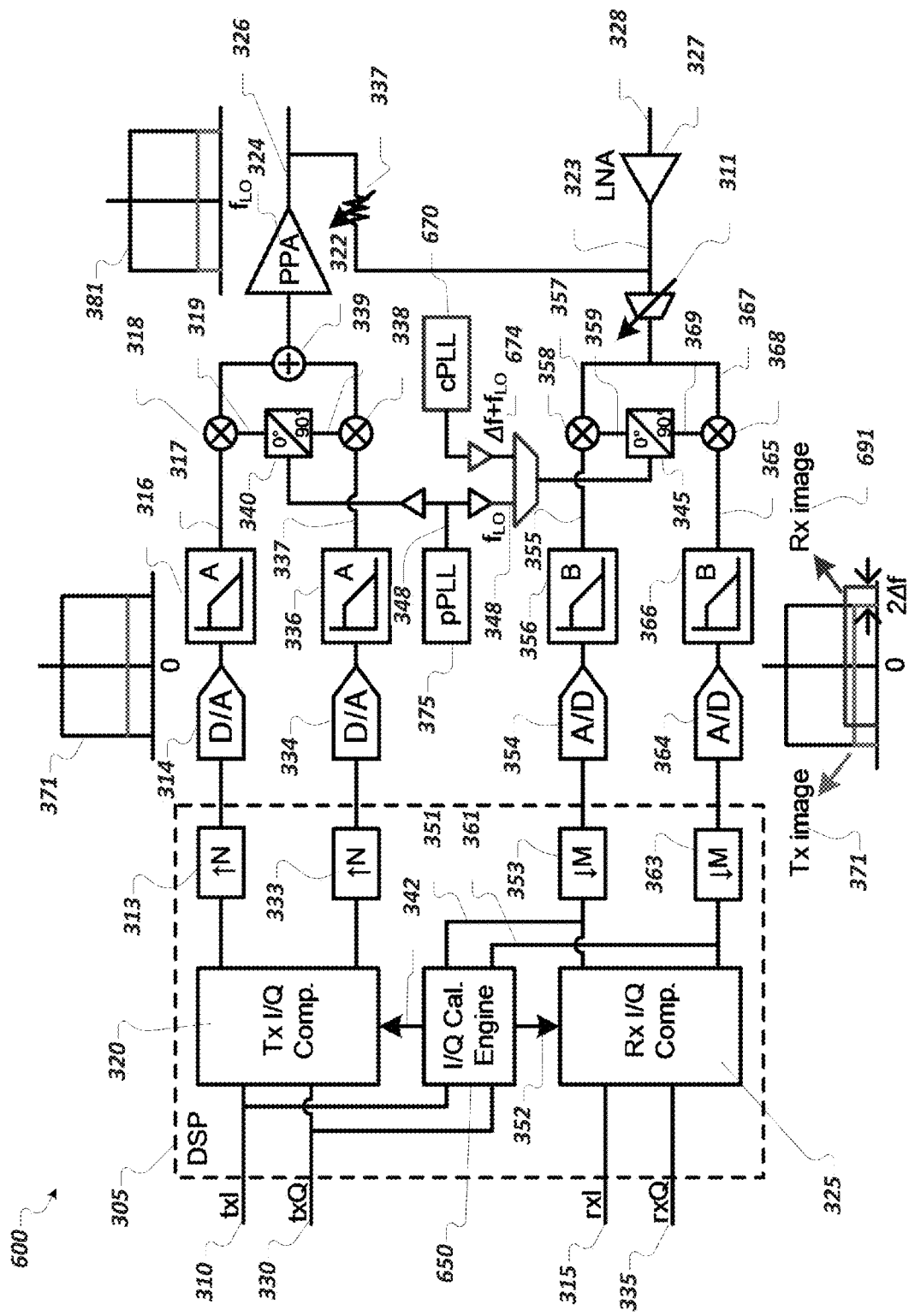
FIG. 6 shows an RF transceiver of a wireless communication device that is capable of performing adaptive I/Q mismatch calibration according to another implementation.

FIG. 6 shows an RF transceiver 600 of a wireless communication device that is capable of performing an adaptive I/Q mismatch calibration, according to another implementation. For example, the RF transceiver 600 represents a wideband time division duplex (TDD) RF transceiver. The RF transceiver 600 shares a substantially similar configuration of the RF transceiver 300 in FIG. 3. Compared to the RF transceiver 300 that includes the phase shifter 370 in the Rx LO circuit, the RF transceiver 600 includes a calibration PLL (cPLL) 670 in addition to the primary PLL (pPPL) 375 in the Rx LO circuit to distinguish the Tx and Rx I/Q mismatches. In some implementations, the cPLL 670 generates an Rx LO sinusoidal signal that has a predetermined frequency offset Δf relative to the LO frequency sinusoidal signal 348. The introduction of the predetermined frequency offset Δf to the Rx LO I/Q sinusoidal signals causes the resulting frequency-shifted Rx LO I/Q sinusoidal signals to be distinguishable from the Tx LO I/Q sinusoidal signal, and thus allows the I/Q calibration engine 350 to distinguish the Tx I/Q from the Rx the I/Q mismatch and to determine the Tx I/Q mismatch parameters and the Rx I/Q mismatch parameters at the same time.

In some implementations, the cPLL 670 generates the frequency-shifted Rx LO sinusoidal signal before generating the Rx LO I/Q sinusoidal signals at the mixer 345. In some implementations, the pPLL 375 is used for all received signals for down-converting received RF signals, whereas the cPLL 670 is used for down-converting the loopback signal (e.g., the Tx LO frequency signal 326 that is looped back to the receiving branch). In some implementations, the phase noise of cPLL 670 is relaxed, so a low cost oscillator such as ring oscillator is used as the cPLL 670.

For example, in the calibration phase, the cPLL 670 generates a calibrating Rx LO sinusoidal signal 674 of a frequency of $\Delta f + f_{LO}$. The calibrating Rx LO sinusoidal signal 674 is fed into the mixer 345. The mixer 345 outputs a frequency-shifted Rx LO frequency sinusoidal signal and its corresponding quadrature sinusoidal signal, which serve as the new in-phase and quadrature Rx LO frequency sinusoidal signals 359 and 369, respectively. The frequency-shifted in-phase and quadrature Rx LO frequency sinusoidal signals 359 and 369 are multiplied with, for example, the in-phase and quadrature components of the Tx LO frequency signal 326 that is looped back to the receiving branch, resulting in an analog loopback in-phase (lbI) signal 355 and quadrature (lbQ) signal 365, respectively. Since the calibrating Rx LO frequency sinusoidal signal 674 has a frequency offset of Δf relative to the frequency $f_{LO}$ of the Tx LO frequency signal 326, a received signal spectrum or Rx image 691 of the analog loopback signal (including the lbI signal 355 and lbQ signal 365) is not centered at DC, but is offset by Δf compared to the baseband transmitted signal spectrum or Tx image 371 corresponding to the Tx LO frequency signal 326 (i.e., before up-converting the baseband analog transmitted signals 317 and 337 to the Tx LO frequency).

The lbI signal 355 and lbQ signal 365 are further filtered by the LPFs 356 and 366, digitized by the A/Ds 354 and 364, and down sampled M times by the respective down-samplers 353 and 363. Since the down-sampled digital lbI and lbQ signals 351 and 361 are based on the frequency-offset rather than phase-shifted Rx LO frequency signal in FIG. 3, a different method is suitable to be used to determine the I/Q mismatch parameters. In some implementations, an I/Q calibration engine 650 receives the down-sampled digital lbI and lbQ signals 351 and 361 and compute the I/Q mismatch parameters (e.g., Tx I/Q mismatch parameters 342 and Rx I/Q mismatch parameters 352) based on the down-sampled digital lbI and lbQ signals 351 and 361. In some implementations, the Tx I/Q compensation unit 320 receives and applies the determined Tx I/Q mismatch parameters 342 for compensating the input Tx signals (e.g., the txI signal 310 and txQ signal 330), resulting in compensated or calibrated txI signal and txQ signal output from the DSP 305. In some implementations, the Rx I/Q compensation unit 325 receives and applies the determined Rx I/Q mismatch parameters 352 for compensating the received signals output from the down-samplers 353 and 363, resulting in compensated or calibrated rxI signal 315 and rxQ signal 335 output from the DSP 305, respectively.

Figure 7:
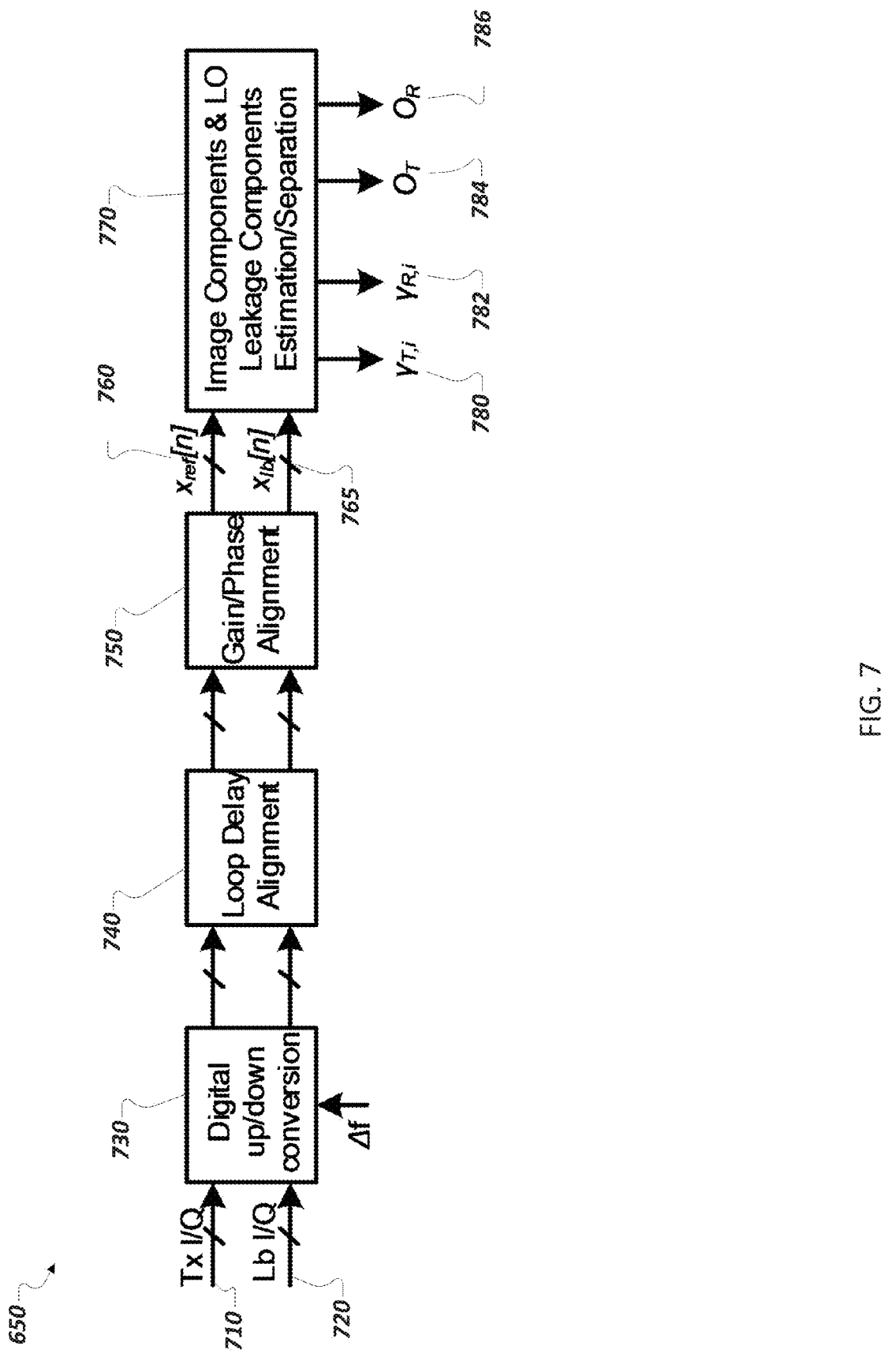
FIG. 7 shows a block diagram of the I/Q calibration engine 650 in FIG. 6, according to an implementation.

FIG. 7 shows a block diagram of the I/Q calibration engine 650 in FIG. 6 according to an implementation. Compared to the I/Q calibration engine 350 in FIG. 4, the I/Q calibration engine 650 includes a digital up/down conversion unit 730, in addition to a loop delay alignment unit 740, a gain/phase alignment unit 750, and an estimation unit 770. In some implementations, an I/Q calibration engine 650 includes additional or different units or components. In some implementations, the I/Q calibration engine 650 is implemented by hardware, software, or a combination thereof. For example, the I/Q calibration engine 650 is implemented by a radio frequency integrated circuit (RFIC), a field-programmable gate array (FPGA), or a register transfer language (RTL) code or other code that runs on a DSP (e.g., the DSP 305 in FIG. 6).

In some implementations, the digital up/down conversion unit 730 performs either shifting txI/txQ signals in the frequency domain by a frequency of −Δf (for example, by multiplying txI/txQ signals with a sinusoid signal with a frequency of −Δf) to align with lbI/lbQ signals, for RX I/Q mismatch calibration, or shifting lbI/lbQ signals in the frequency domain by a frequency of Δf to align with txI/txQ signals, for TX I/Q calibration. In some implementations, the loop delay alignment unit 740, gain/phase alignment unit 750, and estimation unit 770 performs similar operations as the loop delay alignment unit 430, gain/phase alignment unit 440, and estimation unit 460 in FIG. 4, respectively.

In some implementations, the I/Q calibration engine 650 receives a reference signal (e.g., Tx I/Q signals 710 output from a modulator) and a loopback signal (e.g., loopback I/Q signals 720 that has passed through a RX) corresponding to the reference signal. For example, the Tx I/Q signals 710 includes the txI signal 310 and txQ signal 330 that are the in-phase and quadrature components of a digitally modulated signal (e.g., a 1024 QAM signal) output from a modulator. In some implementations, the loopback I/Q signals 720 includes the lbI and lbQ signals 351 and 361 that are the digital in-phase and quadrature components of a loopback signal results from down-converting the Tx LO frequency signal 326 based on the Rx LO frequency sinusoidal signal 674 that is shifted by a predetermined frequency offset Δf.

In some implementations, the digital up/down conversion unit 730 performs digital down conversion of the loopback (Lb) I/Q signals 720 (e.g., including lbI/lbQ signals) for Tx I/Q calibration, whereas the digital up/down conversion unit 730 performs digital up conversion of the Tx I/Q signals 710 (e.g., including txI/txQ signals) for Rx I/Q calibration. As an example, because the center frequencies of original txI/txQ and lbI/lbQ signals differ from each other by an amount of Δf due to the introduced frequency offset. In order to calibrate the I/Q mismatch parameters, a re-alignment in the frequency domain is performed. To calibrate the TX I/Q mismatch so that txI/txQ signals are DC centered, lbI/lbQ signals are shifted by −Δf in frequency domain. To calibrate RX I/Q mismatch so that lbI/lbQ signals are DC centered, the txI/txQ signals are shifted by Δf in frequency domain.

In some implementations, the digital converted signals are aligned in the delay domain by the loop delay alignment unit 740 to account for the delay experienced by the loopback I/Q signals 720. The delay-aligned signals are further gain- and phase-aligned by the gain/phase alignment unit 750. As a result, an aligned reference signal $x_{ref}[n]$ 760 and a corresponding loopback signal $x_{lb}[n]$ 765 that are aligned in the delay, amplitude and phase domains are obtained after passing through the gain/phase alignment unit 750.

In some implementations, the relationship between the aligned reference signal $x_{ref}[n]$ 760 and loopback signal $x_{lb}[n]$ 765 is represented by Equation (14):

$$x_{lb}[n]=e^{-j2\pi\Delta fn}x_{ref}[n]+e^{-j2\pi\Delta fn}\Sigma_{i=0}^{M-1}\gamma_{T,i}x_{ref}[n-i]^*+\Sigma_{i=0}^{N-1}\gamma_{R,i}e^{j2\pi\Delta f[n-i]}x_{ref}[n-i]^*+e^{-j2\pi\Delta fn}O_T+O_R \quad (14).$$

Similar to the estimation unit 460 in FIG. 4, in some implementations, the estimation unit 770 estimates and separates the image components $\gamma_{T,i}$ 780 and $\gamma_{R,i}$ 782 and LO leakage components $O_T$ 784 and $O_R$ 786, for example, based on FIR filter estimation methods such as RLS or LMS method, given the known reference signal $X_{ref}[n]$ and frequency offset $\Delta f$. In some implementations, the frequency offset $\Delta f$ is fixed or configured based on user input or other conditions.

In some implementations, the estimated I/Q mismatch-induced image components $\gamma_{T,i}$ 780 and $\gamma_{R,i}$ 782 and LO leakage components $O_T$ 784 and $O_R$ 786 are returned as the outputs of the I/Q calibration engine 650 and used to compensate Tx and Rx signals. For example, the estimated image component $\gamma_{T,i}$ 780 and LO leakage component $O_T$ 784 are input into the Tx I/Q compensation unit 320 to compensate the txI signal and txQ signal, resulting in a compensated Tx signal $x_{tx,comp}[n]$ according to Equation (13):

$$x_{tx,comp}[n]=x_{tx}[n]-\Sigma_{i=0}^{M-1}\gamma_{T,i}x_{tx}[n-i]^*-O_T \quad (13)$$

On the other hand, the estimated image component $\gamma_{R,i}$ 782 and LO leakage component $O_R$ 786 are input into the Rx I/Q compensation unit 325 to compensate the rxI signal and rxQ signal, resulting in a compensated Rx signal $x_{rx,comp}[n]$ according to Equation (14):

$$x_{rx,comp}[n]=x_{rx}[n]-\Sigma_{i=0}^{M-1}\gamma_{R,i}x_{rx}[n-i]^*-O_R \quad (14).$$

In some implementations, the calibration parameters (e.g., components $\gamma_{T,i}$ 780 and $\gamma_{R,i}$ 782 and LO leakage components $O_T$ 784 and $O_R$ 786) are calculated simultaneously, for example, by the I/Q calibration engine 650, and the calibration of the transmitted signals and the calibration of received signal are performed independently, for example, by the Tx I/Q compensation unit 320 and the Rx I/Q compensation unit 325, respectively. As such, a performance degradation in one of the transmitting branch and the receiving branch does not impact the other.

In some implementations, the adaptive calibration method according to the above techniques described in connection with FIGS. 3 and 4 and FIGS. 6 and 7 is performed on-line or in real time with real transmitting signals. As such, the adaptive calibration method enables PVT variation tracking and requires no dedicated calibration time. In some implementations, the adaptive calibration method estimates and calibrates frequency-dependent I/Q mismatch and thus is suitable to be employed by wideband RF transceivers. The adaptive calibration method also supports foreground training that uses a dedicated training signal, instead of an actual traffic signal, at a reserved training period, instead of normal TX/RX communication period.

Figure 8:
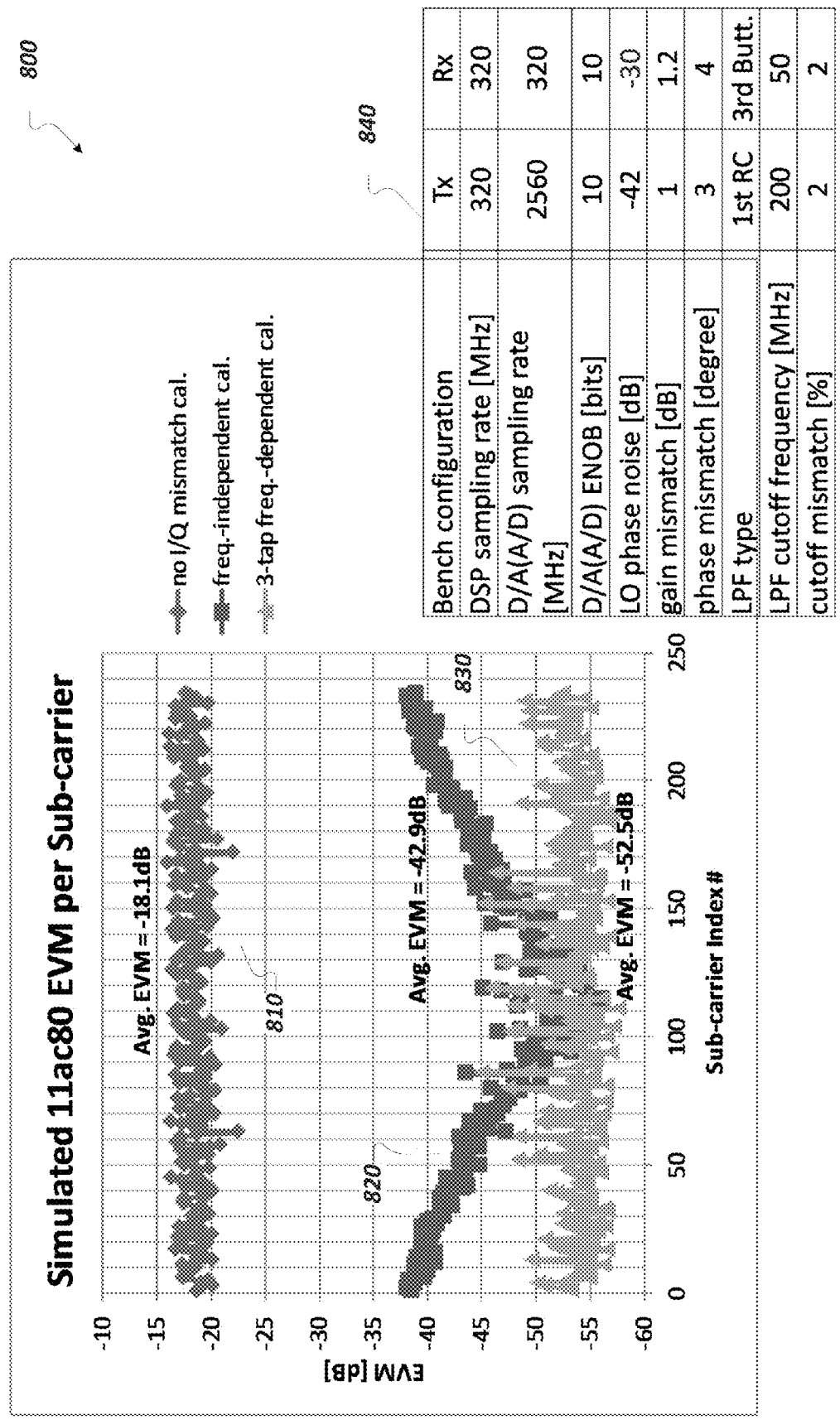
FIG. 8 is a plot showing a simulated EVM performance of the adaptive I/Q mismatch calibration method according to techniques described in connection with FIGS. 6 and 7.

FIG. 8 is a plot 800 showing simulated error vector magnitude (EVM) performance of the adaptive I/Q mismatch calibration method according to the techniques described in connection with FIGS. 6 and 7. The simulation parameters are shown in Table 840, which are the same as those shown in Table 540 of FIG. 5, except that the LO phase noise of the Rx LO (e.g., cPLL 670 in FIG. 6) is −30 dB. The frequency offset $\Delta f$ is 625 kHz.

Similarly to the plot 500 in FIG. 5, the plot 800 shows the EVM performance 830 of the adaptive I/Q mismatch calibration method according to the techniques described in connection with FIGS. 6 and 7 is better than the EVM performance 810 of the case without I/Q mismatch calibration and the EVM performance 820 of the case of an existing I/Q mismatch calibration method that only handles frequency-independent I/Q mismatch. Specifically, the adaptive I/Q mismatch calibration method achieves the lowest average EVM of −82.4 dB, compared to the average EVM of −18.1 dB of the case without I/Q mismatch calibration and the average EVM of −42.9 dB of the case of the existing I/Q mismatch calibration method. Compared to the existing I/Q mismatch calibration method that suffers higher EVMs over a majority of the subcarriers due to its inability to handle frequency-dependent I/Q mismatch, the adaptive I/Q mismatch calibration method band achieves an approximately uniform low EVM across the subcarriers of the signal.

Figure 9:
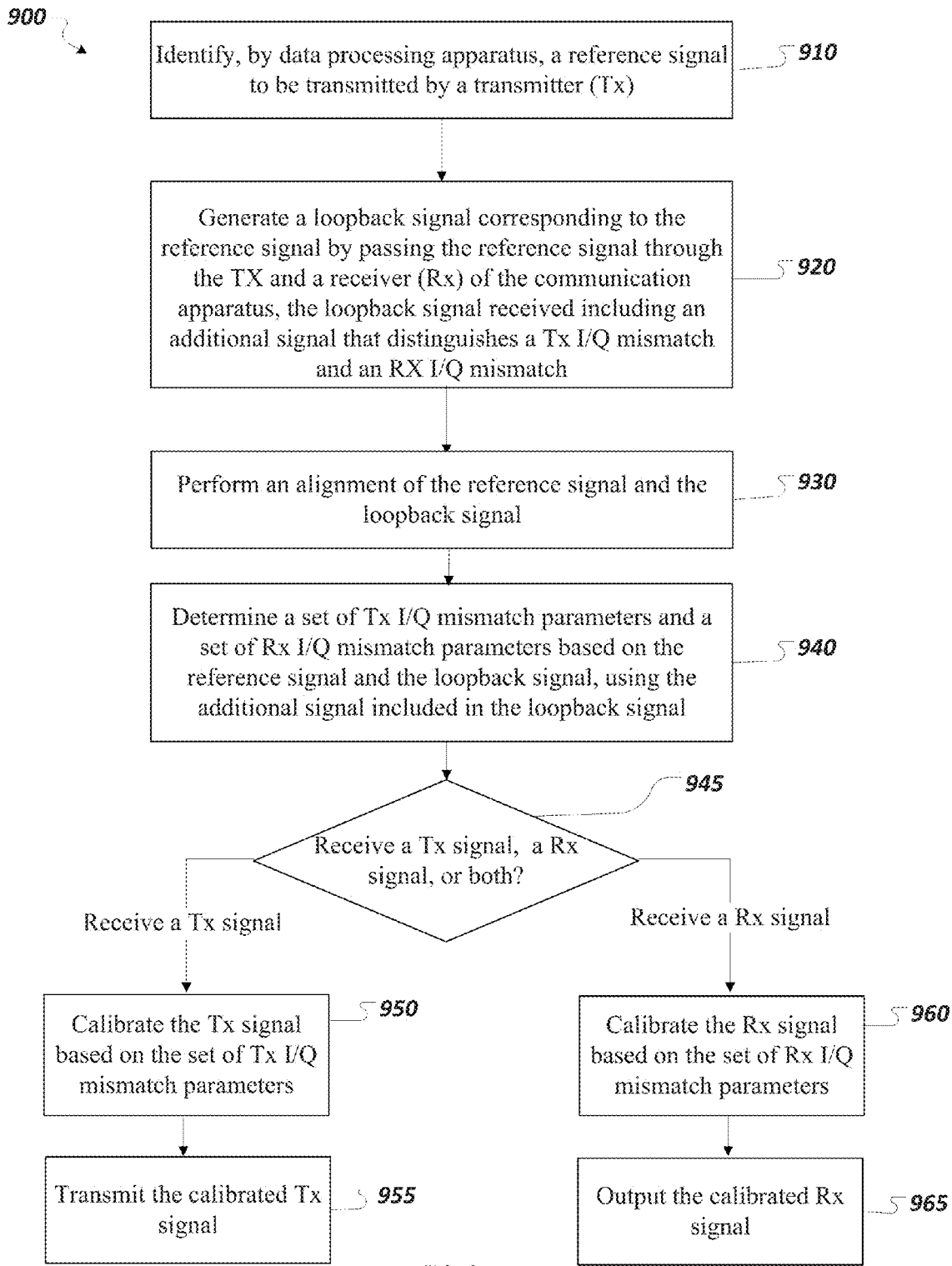
FIG. 9 is a flowchart showing an example of a process of adaptive I/Q mismatch calibration in a communication system.

FIG. 9 is a flowchart showing an example process 900 of implementing an adaptive I/Q mismatch calibration in a communication system. This process is suitable to be implemented by a wireless communication device, such as the example wireless communication device 200 in a communication system such as the system 100. In some implementations, this process is suitable to be implemented by communication apparatus such as the DSP 305 in FIGS. 3 and 6.

At 910, a reference signal is identified, for example, by a communication apparatus (e.g., by the wireless communication device 200.) In some implementations, identifying a signal by the communication apparatus includes receiving, reading, or otherwise accessing the signal by the communication apparatus. The reference signal is a signal to be transmitted by a transmitter (Tx) of the communication apparatus. As an example, the reference signal is the Tx I/Q signals 410. In some implementations, the reference signal includes an in-phase signal component and a quadrature signal component. For example, the reference signal includes the txI signal 310 and txQ signal 330 that are the in-phase and quadrature components of a digitally modulated signal (e.g., a 1024 QAM signal) output from a modulator. In some implementations, the reference signal is a communication signal that includes real data traffic (e.g., actual data that is output to a user by one or more of the wireless devices in the system).

At 920, a loopback signal (e.g., loopback I/Q signals 420) corresponding to the reference signal is generated by the communication apparatus. In some implementations, generating a signal includes creating, modifying, or otherwise obtaining the signal by the communication apparatus. In some implementations, generating the loopback signal by the communication apparatus includes receiving or otherwise identifying the loopback signal by a processor of the communication apparatus (e.g., by the DSP 305 that includes the I/Q calibration engine 350 or the I/Q calibration engine 650). In some implementations, the loopback signal is generated by passing the reference signal through the TX and a receiver (Rx) of the communication apparatus. Accordingly, the loopback signal results from the reference signal passing through the Tx and the Rx. As such, the loopback signal is embedded with, carries, or otherwise includes an in-phase/quadrature (I/Q) mismatch caused by the Tx (Tx I/Q mismatch) and an I/Q mismatch caused by the Rx (RX I/Q mismatch). The loopback signal further includes an additional signal (e.g., one or more of a phase shift, a frequency offset, or a combination of these and other signals) that distinguishes the Tx I/Q mismatch from the Rx I/Q mismatch and thus allows the communication apparatus to decouple and estimate them individually or separately.

In some implementations, the additional signal includes a first phase shift $\phi_1$ that is applied to a Rx LO frequency sinusoidal signal and a second, different phase shift $\phi_2$ that is applied to the Rx LO frequency sinusoidal signal. In this case, the loopback signal includes a first signal and a second signal. The first signal results from down-converting a Tx local oscillator (LO) frequency signal (e.g., the Tx LO frequency signal 326) based on a Rx LO frequency sinusoidal signal 372 that is shifted by the first phase shift $\phi_1$. The Tx LO frequency signal (e.g., the Tx LO frequency signal 326) results from up-converting the reference signal (e.g., the digital txI signal 310 and txQ signal 330) to a Tx LO frequency, for example, through multiple devices in the Tx. The second signal results from down-converting the Tx LO frequency signal (e.g., the Tx LO frequency signal 326) based on the Rx LO frequency sinusoidal signal 374 that is shifted by the second, different phase shift $\phi_2$.

In some implementations, the additional signal includes a predetermined frequency offset Δf that is applied to a Rx LO frequency sinusoidal signal. In this case, the loopback signal includes a signal that results from down-converting a Tx LO frequency signal (e.g., the Tx LO frequency signal 326) based on a Rx LO frequency sinusoidal signal 674 that is shifted by the predetermined frequency offset Δf relative to a Tx LO frequency, wherein the Tx LO frequency signal results (e.g., the Tx LO frequency signal 326) from up-converting the reference signal (e.g., the digital txI signal 310 and txQ signal 330) to the Tx LO frequency.

In some implementations, the loopback signal includes an in-phase signal component and a quadrature signal component. For example, the reference signal includes the Tx I/Q signals 410 that includes the lbI and lbQ signals 351 and 361. The lbI and lbQ signals 351 and 361 are the digital in-phase and quadrature components of a loopback signal corresponding to the Tx LO frequency signal 326 that is generated based on the reference signal (i.e., the Tx I/Q signals 410 that includes the txI signal 310 and txQ signal 330).

At 930, an alignment of the reference signal and the loopback signal is performed. In some implementations, the alignment include one or more of a delay alignment, a phase alignment, or a gain alignment on the reference signal and the loopback signal so that the reference signal and the loopback signal have compatible (e.g., the same or substantially the same) time delays, phases and gains, respectively. These alignments are performed, for example, by the delay alignment unit 430 or 740, and the gain/phase alignment unit 440 or 750 according to the example techniques described in connection with FIGS. 4 and 7, respectively. In some implementations, delay alignment (for example, including integer delay and fractional delay), phase alignment and gain alignment are all performed, for example, for calibration with real traffic signal or wideband signal. In some implementations, delay alignment is removed but phase and gain alignments are performed for calibration with a training signal (for example, a sinusoidal signal), such as in foreground training.

At 940, a set of Tx I/Q mismatch parameters and a set of Rx I/Q mismatch parameters based on the reference signal and the loopback signal are determined using the additional signal included in the loopback signal by the communication apparatus. In some implementations, the set of Tx I/Q mismatch parameters and the set of Rx I/Q mismatch parameters are determined based on the reference signal and the loopback signal according to the example techniques described in connection with FIGS. 4 and 7. For example, in the case where the loopback signal includes the first signal and the second signal based on phase-shifted Rx LO frequency sinusoidal signal, the set of Tx I/Q mismatch parameters and the set of Rx I/Q mismatch parameters are determined according to the example techniques described in connection with FIG. 4. On the other hand, in the case where the loopback signal includes the first signal and the second signal based on frequency-shifted Rx LO frequency sinusoidal signal, the set of Tx I/Q mismatch parameters and the set of Rx I/Q mismatch parameters are determined according to the example techniques described in connection with FIG. 7, in some implementations. In either case, the set of Tx I/Q mismatch parameters and the set of Rx I/Q mismatch parameters are determined based on the reference signal and the loopback signal in the time domain. For example, determining the set of Tx I/Q mismatch parameters and the set of Rx I/Q mismatch parameters includes determining a set of time-domain Tx I/Q mismatch parameters and a set of time-domain Rx I/Q mismatch parameters that correspond to a frequency-dependent Tx I/Q mismatch and a frequency-dependent Rx I/Q mismatch, respectively. In some implementations, the set of Tx I/Q mismatch parameters and the set of Rx I/Q mismatch parameters are determined according to a finite impulse response (FIR) filter estimation method (e.g., according to a recursive least squares (RLS) or least mean square (LMS) method). For example, the set of Tx I/Q mismatch parameters and the set of Rx I/Q mismatch parameters are determined by using a FIR filter estimation method to estimate one or more time-domain taps of the set of Tx I/Q mismatch parameters and the set of Rx I/Q mismatch parameters in the time domain.

In some implementations, the set of Tx I/Q mismatch parameters and the set of Rx I/Q mismatch parameters include image components and LO leakage components caused by the Tx I/Q mismatch and the Rx I/Q mismatch, respectively. For example, the set of Tx I/Q mismatch parameters include the image component $\gamma_{T,i}$ 470 or 780 and LO leakage component $O_T$ 474 or 784. In some implementations, the set of Rx I/Q mismatch parameters include the image component $\gamma_{R,i}$ 472 or 782 and LO leakage component $O_R$ 476 or 786. In some implementations, the set of Tx I/Q mismatch parameters and the set of Rx I/Q mismatch parameters include additional or different parameters that reflect the effects of the Tx I/Q mismatch and Rx I/Q mismatch on the Tx signal and Rx signal.

At 945, whether a Tx signal, a Rx signal, or both are received is determined. In some implementations, the Tx signal is a second signal to be transmitted by the Tx, different from the reference signal. In some implementations, the Rx signal is a second signal received by the Rx, different from the loopback signal.

At 950, in response to receiving the Tx signal, for example, by the Tx, the Tx signal is calibrated or compensated based on the set of Tx I/Q mismatch parameters by the communication apparatus. In some implementations, the Tx signal is calibrated by applying the determined set of Tx I/Q mismatch parameters to the Tx signal according to the Equation (10) or (12). At 955, the calibrated Tx signal is transmitted by the Tx.

At 960, in response to receiving the Rx signal, for example, by the Rx, the Rx signal is calibrated or compensated based on the set of Rx I/Q mismatch parameters. In some implementations, the Rx signal is calibrated according to the Equation (11) or (13). At 965, the calibrated Rx signal is output, for example, for demodulation and decoding.

The calibrating the Tx signal at 950 is performed independently from the calibrating the Rx signal at 960, for example, by the Tx I/Q compensation unit 320 and the Rx I/Q compensation unit 325, respectively. In some implementations, the reference signal includes actual data traffic (e.g., real-time data traffic) of a wireless communication network. In this case, the Tx signal and the Rx signal also include ensuing actual data traffic. As such, in some implementations, on-line adaptive I/Q mismatch calibration is performed by determining, dynamically, the set of Tx I/Q mismatch parameters and the set of Rx I/Q mismatch parameters based on the reference signal that includes actual data traffic, and applying the determined up-to-date set of Tx I/Q mismatch parameters to the Tx signal and the up-to-date set of Rx I/Q mismatch parameters to the Rx signal, respectively in real time.

In some implementations, both the Tx signal and the Rx signal are received, for example, substantially at the same time by the Tx and the Rx, respectively at 945. As an example, the Tx receives the Tx signal to be transmitted output from the DSP while the Rx receives an RF signal picked up by an antenna. As another example, the Tx and Rx operate in a frequency division duplex (FDD) mode or use different antennas. In these cases, the calibrating the Tx signal at 950 are performed in parallel, simultaneously or otherwise concurrently with the calibrating the received signal at 960, in an embodiment.

In some implementations, both the set of Tx I/Q mismatch parameters and the set of Rx I/Q mismatch parameters are determined in a transmitting mode of the transceiver; calibrating the Tx signal is performed once the set of Tx I/Q mismatch parameters are determined, whereas the set of Rx I/Q mismatch parameters are saved for calibrating the Rx signal in a later receiving mode.

While this specification contains many specifics, these should not be construed as limitations on the scope of what is claimed, but rather as descriptions of features that is specific to particular embodiments. In some implementations, certain features that are described in this specification in the context of separate embodiments is also suitable to be implemented in combination in a single embodiment. Conversely, various features that are described in the context of a single embodiment is also suitable to be implemented in multiple embodiments separately, or in any suitable subcombination, in some implementations. Moreover, although features are described above as acting in certain combinations, and even initially claimed as such, one or more features from a claimed combination, in some cases, are excised from the combination, and the claimed combination is directed to a subcombination or variation of a subcombination, for instance.

Similarly, while operations are depicted in the drawings in a particular order, this should not be understood as requiring that such operations be performed in the particular order shown or in sequential order, or that all illustrated operations be performed to achieve desirable results. In certain circumstances, multitasking and parallel processing are advantageous. Moreover, the separation of various system components in the embodiments described above should not be understood as requiring such separation in all embodiments.

Other embodiments fall within the scope of the following claims.

What is claimed is:

1. A method comprising:
   identifying, by a communication apparatus, a reference signal to be transmitted by a transmitter (Tx) of the communication apparatus;
   generating, by the communication apparatus, a loopback signal corresponding to the reference signal by passing the reference signal through the Tx and a receiver (Rx) of the communication apparatus, the loopback signal including an additional signal that distinguishes an in-phase/quadrature (I/Q) mismatch caused by the Tx (Tx I/Q mismatch) from an I/Q mismatch caused by the Rx (RX I/Q mismatch);
   determining, by the communication apparatus, a set of Tx I/Q mismatch parameters and a set of Rx I/Q mismatch parameters based on the reference signal and the loopback signal, using the additional signal included in the loopback signal;
   calibrating, by the communication apparatus, a Tx signal based on the set of Tx I/Q mismatch parameters, the Tx signal being a second signal to be transmitted by the Tx; and
   calibrating, by the communication apparatus, a Rx signal based on the set of Rx I/Q mismatch parameters, the Rx signal being a second signal received by the Rx, wherein the calibrating the Rx signal is performed independently from the calibrating the Tx signal.

2. The method of claim 1, wherein the reference signal comprises actual real-time data traffic of a wireless communication network, and the calibrating of the Tx signal is performed concurrently with the calibrating of the Rx signal.

3. The method of claim 1, further comprising performing one or more of a delay alignment, a phase alignment and a gain alignment of the reference signal and the loopback signal so that the reference signal and the loopback signal have compatible time delays, phases and gains, respectively.

4. The method of claim 1, wherein the set of Tx I/Q mismatch parameters comprise image components and local oscillator (LO) leakage components caused by the Tx I/Q mismatch, and the set of Rx I/Q mismatch parameters comprise image components and LO leakage components caused by the Rx I/Q mismatch.

5. The method of claim 1, wherein determining a set of Tx I/Q mismatch parameters and a set of Rx I/Q mismatch parameters comprises determining a set of time-domain Tx I/Q mismatch parameters and a set of time-domain Rx I/Q mismatch parameters that correspond to a frequency-dependent Tx I/Q mismatch and a frequency-dependent Rx I/Q mismatch, respectively.

6. The method of claim 1, wherein determining a set of Tx I/Q mismatch parameters and a set of Rx I/Q mismatch parameters based on the reference signal and the loopback signal comprises using a finite impulse response (FIR) filter estimation method to estimate one or more time-domain taps of the set of Tx I/Q mismatch parameters and the set of Rx I/Q mismatch parameters based on the reference signal and the loopback signal in a time domain.

7. The method of claim 1, wherein the additional signal comprises a first phase shift that is applied to a Rx LO frequency sinusoidal signal and a second, different phase shift that is applied to the Rx LO frequency sinusoidal signal, and the loopback signal comprises:
   a first signal that results from down-converting a Tx local oscillator (LO) frequency signal based on the Rx LO frequency sinusoidal signal that is shifted by the first phase shift, wherein the Tx LO frequency signal results from up-converting the reference signal to a Tx LO frequency; and
   a second signal that results from down-converting the Tx LO frequency signal based on the Rx LO frequency sinusoidal signal that is shifted by the second, different phase shift.

8. The method of claim 1, wherein the additional signal comprises a predetermined frequency offset that is applied to a Rx LO frequency sinusoidal signal, and the loopback signal comprises a signal that results from down-converting a Tx local oscillator (LO) frequency signal based on the Rx LO frequency sinusoidal signal that is shifted by the predetermined frequency offset relative to a Tx LO frequency, wherein the Tx LO frequency signal results from up-converting the reference signal to the Tx LO frequency.

9. A device comprising:
   a transmitter;
   a receiver; and
   a processor configured to cause the device to:
      identify a reference signal to be transmitted by a transmitter (Tx) of the communication apparatus;
      generate a loopback signal corresponding to the reference signal by passing the reference signal through the TX and a receiver (Rx) of the communication apparatus, the loopback signal including an additional signal that distinguishes an in-phase/quadrature (I/Q) mismatch caused by the Tx (Tx I/Q mismatch) from an I/Q mismatch caused by the Rx (RX I/Q mismatch);
      determine a set of Tx I/Q mismatch parameters and a set of Rx I/Q mismatch parameters based on the reference signal and the loopback signal, using the additional signal included in the loopback signal;
      calibrate a Tx signal based on the set of Tx I/Q mismatch parameters, the Tx signal being a second signal to be transmitted by the Tx; and
      calibrate a Rx signal based on the set of Rx I/Q mismatch parameters, the Rx signal being a second signal received by the Rx, wherein the calibrating the Rx signal is performed independently from the calibrating the Tx signal.

10. The device of claim 9, wherein the reference signal comprises actual real-time data traffic of a wireless communication network, and the calibrating of the Tx signal is performed concurrently with the calibrating of the Rx signal.

11. The device of claim 9, wherein the set of Tx I/Q mismatch parameters comprise image components and local oscillator (LO) leakage components caused by the Tx I/Q mismatch, and the set of Rx I/Q mismatch parameters comprise image components and LO leakage components caused by the Rx I/Q mismatch.

12. The device of claim 9, wherein determining a set of Tx I/Q mismatch parameters and a set of Rx I/Q mismatch parameters comprises determining a set of time-domain Tx I/Q mismatch parameters and a set of time-domain Rx I/Q mismatch parameters that correspond to a frequency-dependent Tx I/Q mismatch and a frequency-dependent Rx I/Q mismatch, respectively.

13. The device of claim 9, wherein determining a set of Tx I/Q mismatch parameters and a set of Rx I/Q mismatch parameters based on the reference signal and the loopback signal comprises using a finite impulse response (FIR) filter estimation method to estimate one or more time-domain taps of the set of Tx I/Q mismatch parameters and the set of Rx I/Q mismatch parameters based on the reference signal and the loopback signal in a time domain.

14. The device of claim 9, wherein the additional signal comprises a first phase shift that is applied to a Rx LO frequency sinusoidal signal and a second, different phase shift that is applied to the Rx LO frequency sinusoidal signal, and the loopback signal comprises:
   a first signal that results from down-converting a Tx local oscillator (LO) frequency signal based on the Rx LO frequency sinusoidal signal that is shifted by the first phase shift, wherein the Tx LO frequency signal results from up-converting the reference signal to a Tx LO frequency; and
   a second signal that results from down-converting the Tx LO frequency signal based on the Rx LO frequency sinusoidal signal that is shifted by the second, different phase shift.

15. The device of claim 9, wherein the additional signal comprises a predetermined frequency offset that is applied to a Rx LO frequency sinusoidal signal, and the loopback signal comprises a signal that results from down-converting a Tx local oscillator (LO) frequency signal based on the Rx LO frequency sinusoidal signal that is shifted by the predetermined frequency offset relative to a Tx LO frequency, wherein the Tx LO frequency signal results from up-converting the reference signal to the Tx LO frequency.

16. A non-transitory computer-readable medium embodying a program operable to cause a communication device to perform operations comprising:
   identifying, by the communication apparatus, a reference signal to be transmitted by a transmitter (Tx) of the communication apparatus;
   generating, by the communication apparatus, a loopback signal corresponding to the reference signal by passing the reference signal through the TX and a receiver (Rx) of the communication apparatus, the loopback signal including an additional signal that distinguishes an in-phase/quadrature (I/Q) mismatch caused by the Tx (Tx I/Q mismatch) from an I/Q mismatch caused by the Rx (RX I/Q mismatch);
   determining, by the communication apparatus, a set of Tx I/Q mismatch parameters and a set of Rx I/Q mismatch parameters based on the reference signal and the loopback signal, using the additional signal included in the loopback signal;
   calibrating, by the communication apparatus, a Tx signal based on the set of Tx I/Q mismatch parameters, the Tx signal being a second signal to be transmitted by the Tx; and
   calibrating, by the communication apparatus, a Rx signal based on the set of Rx I/Q mismatch parameters, the Rx signal being a second signal received by the Rx, wherein the calibrating the Rx signal is performed independently from the calibrating the Tx signal.

17. The non-transitory computer-readable medium of claim 16, wherein determining a set of Tx I/Q mismatch parameters and a set of Rx I/Q mismatch parameters comprises determining a set of time-domain Tx I/Q mismatch parameters and a set of time-domain Rx I/Q mismatch parameters that correspond to a frequency-dependent Tx I/Q mismatch and a frequency-dependent Rx I/Q mismatch, respectively.

18. The non-transitory computer-readable medium of claim 16, wherein determining a set of Tx I/Q mismatch parameters and a set of Rx I/Q mismatch parameters based on the reference signal and the loopback signal comprises using a finite impulse response (FIR) filter estimation method to estimate one or more time-domain taps of the set of Tx I/Q mismatch parameters and the set of Rx I/Q mismatch parameters based on the reference signal and the loopback signal in a time domain.

19. The non-transitory computer-readable medium of claim 16, wherein the additional signal comprises a first phase shift that is applied to a Rx LO frequency sinusoidal signal and a second, different phase shift that is applied to the Rx LO frequency sinusoidal signal, and the loopback signal comprises:

a first signal that results from down-converting a Tx local oscillator (LO) frequency signal based on the Rx LO frequency sinusoidal signal that is shifted by the first phase shift, wherein the Tx LO frequency signal results from up-converting the reference signal to a Tx LO frequency; and a second signal that results from down-converting the Tx LO frequency signal based on the Rx LO frequency sinusoidal signal that is shifted by the second, different phase shift.

20. The non-transitory computer-readable medium of claim 16, wherein the additional signal comprises a predetermined frequency offset that is applied to a Rx LO frequency sinusoidal signal, and the loopback signal comprises a signal that results from down-converting a Tx local oscillator (LO) frequency signal based on the Rx LO frequency sinusoidal signal that is shifted by the predetermined frequency offset relative to a Tx LO frequency, wherein the Tx LO frequency signal results from up-converting the reference signal to the Tx LO frequency.

* * * * *